United States Patent
Kim et al.

(10) Patent No.: US 12,424,630 B2
(45) Date of Patent: Sep. 23, 2025

(54) $M_{n+1}AX$ CARBIDE ADDITIVE MATERIALS FOR LITHIUM-ION BATTERIES

(71) Applicant: Rivian IP Holdings, LLC, Plymouth, MI (US)

(72) Inventors: Soo Kim, Fremont, CA (US); Yumi Kim, San Jose, CA (US); Byoungchul You, Saratoga, CA (US); Cary Michael Hayner, Naperville, IL (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 524 days.

(21) Appl. No.: 17/975,203

(22) Filed: Oct. 27, 2022

(65) Prior Publication Data

US 2024/0145714 A1    May 2, 2024

(51) Int. Cl.
*H01M 4/62*     (2006.01)
*H01M 10/0525*  (2010.01)
*H01M 4/02*     (2006.01)

(52) U.S. Cl.
CPC ......... *H01M 4/62* (2013.01); *H01M 10/0525* (2013.01); *H01M 2004/027* (2013.01); *H01M 2220/20* (2013.01)

(58) Field of Classification Search
None
See application file for complete search history.

(56) References Cited

U.S. PATENT DOCUMENTS

2023/0268548 A1* 8/2023 Parrondo ............... H01M 4/661
                                                429/3
2024/0128464 A1* 4/2024 Zhang ................... H01M 4/668

\* cited by examiner

*Primary Examiner* — Wyatt P McConnell
(74) *Attorney, Agent, or Firm* — BAKERHOSTETLER

(57) ABSTRACT

Particular embodiments may provide a lithium-ion battery comprising a MAX compound to prevent and/or decrease Manganese dissolution. In some embodiments, the MAX compound comprises the formula $M_{n+1}AX_n$, wherein M is an early transition metal atom, n is an integer from 1 to 3, A is a group 13 or group 14 element, and X is C or N.

20 Claims, 19 Drawing Sheets

$M_{n+1}AX$ CARBIDE ADDITIVE MATERIALS FOR LITHIUM-ION BATTERIES

INTRODUCTION

This disclosure generally relates to additive materials for lithium-ion batteries, and more particularly, to additive materials that decrease or prevent manganese dissolution in the liquid electrolyte of lithium-ion batteries.

BRIEF SUMMARY

Provided herein are additive materials for lithium-ion batteries comprising a compound of formula $M_{n+1}AX_n$, where M is an early transition metal atom, n is an integer from 1 to 3, A is group 13 or group 14 element, and X is C or N. Also provided are battery cells comprising said additive materials and electric vehicle systems comprising said additive materials. The additive materials described herein can decrease or prevent manganese dissolution in the liquid electrolyte of lithium-ion batteries.

In a first aspect, provided herein is a lithium-ion battery comprising a compound of formula $M_{n+1}AX_n$, wherein: M is an early transition metal atom; n is an integer from 1 to 3; A is a group 13 or group 14 element; and X is C or N. In some embodiments, M is Cr, Ti, or Zr. In some embodiments, A is Al or Si, and X is C. In some embodiments, n is 1 or 2.

In some embodiments, the compound is $Cr_2AlC$, $Ti_3SiC_2$ or $Zr_2AlC$. In some embodiments, the compound is $V_2AlC$ or $Ti_3AlC_2$. In some embodiments, the compound is $Nb_2AlC$, $Nb_3AlC_2$, $Nb_4AlC_3$, or $V_4AlC_3$.

In some embodiments, the lithium-ion battery comprises an anode that comprises the compound. In some such embodiments, the compound is mixed with anode active materials of the anode. In other such embodiments, the lithium-ion battery comprises: a first layer comprising anode active material of the anode; and a second layer adjacent the first layer comprising the compound. In some embodiments, the anode comprises graphite and/or silicon.

In some embodiments, the lithium-ion battery comprises a cathode that comprises the compound. In some such embodiments, the cathode comprises one or more of LMFP, LMO, $LiMO_2$, $Li_{1+x}M_{1-x}O_2$, and $Li_2MnO_3$.

In some embodiments, the lithium-ion battery comprises a separator that comprises the compound.

In some embodiments, the compound is deposited as a thin film.

In some embodiments, the compound has a hexagonal space group.

In some embodiments, the compound comprises a layered structure. In some such embodiments, the compound comprises edge-sharing, distorted $XM_6$ octahedra interleaved by single planar layers of A.

In some embodiments, the compound comprises 0.1 to 10 wt. % of the lithium-ion battery.

In another aspect, provided herein is an electric vehicle system comprising the lithium-ion battery of any of the preceding embodiments.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the Figures, like reference numerals refer to like components unless otherwise stated herein.

DETAILED DESCRIPTION

Lithium-ion batteries include active materials forming electrodes separated by a non-aqueous electrolyte for ionic conduction between the electrodes. The active materials forming the electrodes react chemically during a charge/discharge cycle to produce electrical energy as the ions conduct between the electrodes. The electrodes (e.g., the cathode and anode) of a lithium-ion battery supply the lithium ions which move between the cathode and anode via the electrolyte when charging and discharging the battery. In addition to lithium, the electrodes of a lithium-ion battery can include a compound with Manganese (Mn), which can improve the capacity, rechargeability, safety, and longevity of the battery. However, Manganese can tend to dissolve in the liquid electrolyte used in lithium-ion batteries. Manganese dissolution in lithium-ion batteries can trigger capacity loss and structural changes that reduce the longevity of the battery.

Provided herein are lithium-ion batteries with additive materials that can prevent or decrease Manganese ion dissolution during the chemical reactions that occur during charge/discharge cycles to produce electrical energy. The additive materials discussed herein exhibit thermodynamic stability and as such are less prone to dissolution. A lithium-ion battery incorporating one or more MAX compounds as described herein can exhibit less or no Manganese dissolution, and thus exhibit improved capacity relative to a lithium-ion battery without the one or more MAX compounds.

Figure 1:
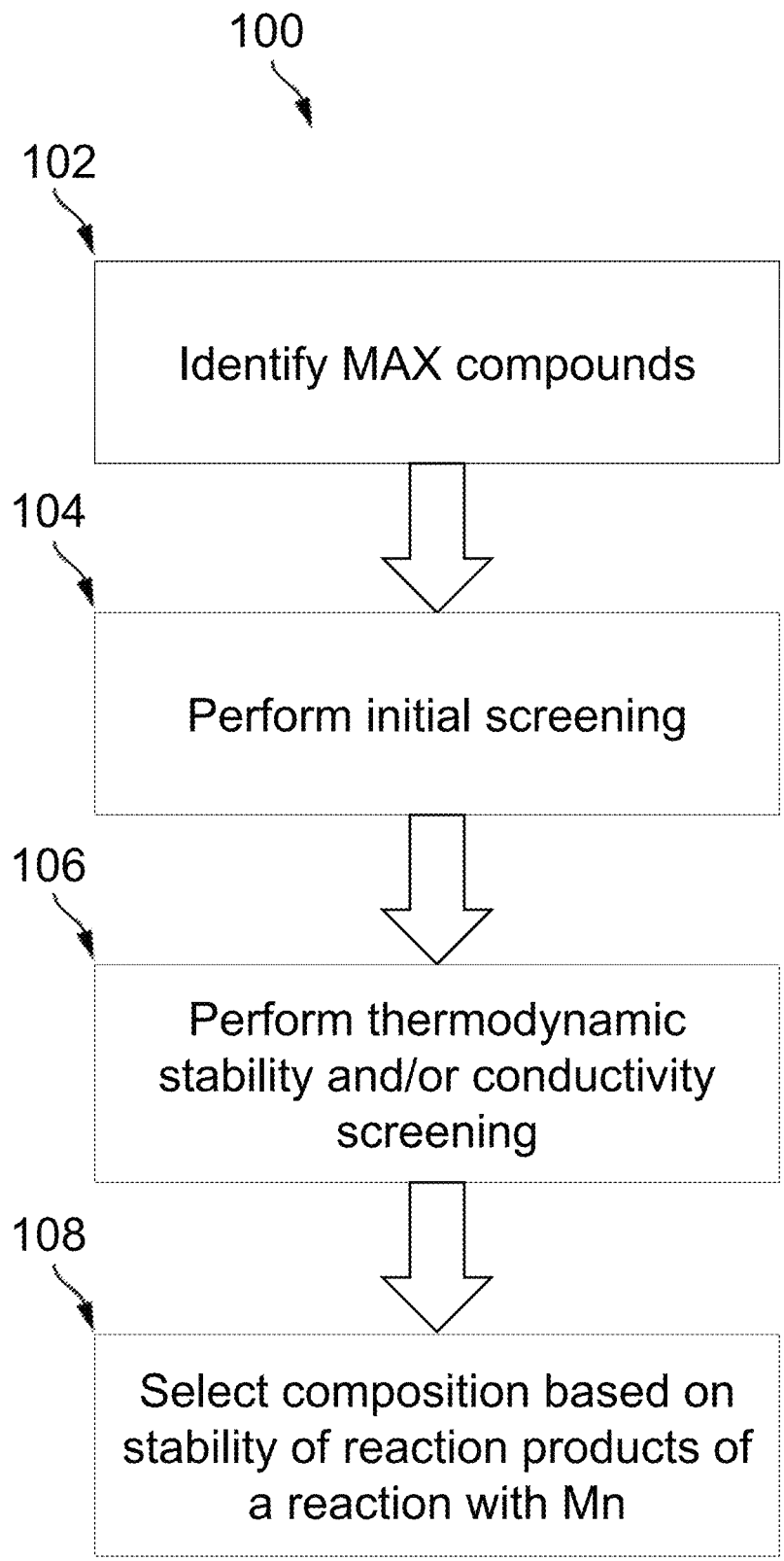
FIG. 1 illustrates an exemplary method to identify additive compounds for lithium-ion batteries, in accordance with some embodiments disclosed herein.

FIG. 1 illustrates an exemplary method 100 to identify additive compounds for lithium-ion batteries. In one or more examples, method 100 begins at step 102 wherein MAX compounds are identified. In one or more examples, each of the MAX compounds have the general formula $M_{n+1}AX_n$, where n is an integer between 1 and 3, M is an early transition metal, A is a group 13 or group 14 element and X is Carbon (C) or Nitrogen (N). The early transition metal element can be selected from the group comprising Sc, Ti, V, Cr, Zr, Nb, Mo, Hf, and Ta. The group 13 and group 14 element can be selected from the group comprising Al, Si, P, S, Ga, Ge, As, Cd, In, Sn, Tl, and Pb.

The initial MAX compounds identified according to step 102 of method 100 are shown in Table 1, below.

TABLE 1

Initial MAX Compounds.

| Category | Compounds |
|---|---|
| 211 | $Ti_2CdC$, $Sc_2InC$, $Sc_2SnC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2SnN$, $Hf_2SC$, $Zr_2AlC$, $Ti_2ZnC$, $Ti_2ZnN$, $V_2ZnC$, $Nb_2CuC$, $Mn_2GaC$, $Mo_2AuC$, $Ti_2AuN$ |
| 312 | $Ti_3AlC_2$, $Ti_3GaC_2$, $Ti_3InC_2$, $V_3AlC_2$, $Ti_3SiC_2$, $Ti_3GeC_2$, $Ti_3SnC_2$, $Ta_3AlC_2$, $Ti_3ZnC_2$, $Zr_3AlC_2$, $Nb_3AlC_2$ |
| 413 | $Ti_4AlN_3$, $V_4AlC_3$, $Ti_4GaC_3$, $Ti_4SiC_3$, $Ti_4GeC_3$, $Nb_4AlC_3$, $Ta_4AlC_3$, $(Mo,V)_4AlC_3$ |
| 514 | $Mo_4VAlC_4$ |

After identifying MAX compounds at step 102, the method 100 move to step 104 wherein an initial screening of the MAX is performed. The initial screening of step 104 can include removing noble metals, toxic metals and expensive elements. Optionally, elements that are more expensive than Lithium can be removed at step 104. In one or more examples, Cd, Pb, As, Sc, Tl, Ga, Ge, Hf, and Ta can be removed at step 104. The initial screening of step 104 can include removing certain compounds based on chemical stability considerations (e.g., for being chemically unstable). For instance, nitrides, and P- and S-bearing compounds can be removed at step 104 based on chemical stability. The initial screening of step 104 can include removing certain compounds based on complexity. For example, quaternary species can removed due to being too complex. The screened MAX compounds based on the initial screening performed according to step 104 of method 100 are shown in Table 2, below.

TABLE 2

Initially-Screened MAX Compounds.

| Category | Compounds |
|---|---|
| 211 | $Ti_2AlC$, $V_2AlC$, $Ti_2SnC$, $Cr_2AlC$, $Nb_2AlC$, $Zr_2SnC$, $Nb_2SnC$, $Zr_2AlC$, $Ti_2ZnC$, $V_2ZnC$, $Nb_2CuC$ |
| 312 | $Ti_3AlC_2$, $V_3AlC_2$, $Ti_3SiC_2$, $Ti_3SnC_2$, $Ti_3ZnC_2$, $Zr_3AlC_2$, $Nb_3AlC_2$ |
| 413 | $Ti_4AlN_3$, $V_4AlC_3$, $Ti_4SiC_3$, $Nb_4AlC_3$ |

After performing the initial screening at step 104, the method 100 can move to step 106 wherein thermodynamic stability and/or conductivity screening is performed.

To assess thermodynamic stability, the energy above the convex hull ($E_{hull}$) of each compound can be considered. When the energy above the convex hull ($E_{hull}$) is 0, the compound is thermodynamically stable. When the energy above the convex hull ($E_{hull}$) is above 0, the compound is metastable (i.e., decomposes to more thermodynamically stable phase mixtures). When the energy above the convex hull ($E_{hull}$) is greater than 0 but less than about 25 meV/atom, the compound is thermodynamically nearly stable. When the compound is nearly stable, it is highly likely that it can successfully be stabilized at room temperature, where the thermal energy, $k_BT$, at room temperature is 25.7 meV. Here, $k_B$ is the Boltzmann constant ($8.617333262 \times 10^{-5}$ eV/K) and T is the temperature (here, room temperature, 298.15 K). The value of $k_BT$ is referring to the probability of finding a system in a state of energy E, given that it is in a surrounding environment at temperature T. In other words, if the value of $E_{hull}$ is less than about 25 meV/atom, there is a likelihood to find the corresponding compound at room temperature (i.e., 25° C.).

To assess conductivity, the bandgap ($E_g$) of each compound can be considered. For anode materials, it is important that the compound has a bandgap that corresponds to either a zero bandgap (metallic) or semi-conducting (i.e., less than about 1.2 eV), or any $E_g$ value in between 0 to 1.2 eV. When $E_g$ value is close to zero (e.g., less than 0.1 eV, or so), it can be considered as semi-metallic. The energy above the convex hull ($E_{hull}$) and bandgap ($E_g$) of each compound is shown in Table 3, below.

TABLE 3

Stability Screening of MAX Compounds.

| Compound | Space Group | $E_{hull}$ (eV) | Bandgap $E_g$ (eV) |
|---|---|---|---|
| $Ti_2AlC$ | $P6_3/mmc$ (Hexagonal) | 0.000 | 0.00 |
| $V_2AlC$ | $P6_3/mmc$ (Hexagonal) | 0.000 | 0.00 |
| $Ti_2SnC$ | $P6_3/mmc$ (Hexagonal) | 0.000 | 0.00 |
| $Cr_2AlC$ | $P6_3/mmc$ (Hexagonal) | 0.000 | 0.00 |
| $Nb_2AlC$ | $P6_3/mmc$ (Hexagonal) | 0.000 | 0.00 |

TABLE 3-continued

Stability Screening of MAX Compounds.

| Compound | Space Group | $E_{hull}$ (eV) | Bandgap $E_g$ (eV) |
|---|---|---|---|
| $Zr_2SnC$ | $P6_3/mmc$ (Hexagonal) | 0.000 | 0.00 |
| $Nb_2SnC$ | $P6_3/mmc$ (Hexagonal) | 0.000 | 0.00 |
| $Zr_2AlC$ | $P6_3/mmc$ (Hexagonal) | 0.014 | 0.00 |
| $Ti_2ZnC$ | $P6_3/mmc$ (Hexagonal) | ~0 | <0.1 |
| $V_2ZnC$ | $P6_3/mmc$ (Hexagonal) | ~0 | <0.1 |
| $Nb_2CuC$ | $P6_3/mmc$ (Hexagonal) | ~0 | <0.1 |
| $Ti_3AlC_2$ | $P6_3/mmc$ (Hexagonal) | 0.000 | 0.00 |
| $Ti_3SiC_2$ | $P6_3/mmc$ (Hexagonal) | 0.000 | 0.00 |
| $Ti_3SnC_2$ | $P6_3/mmc$ (Hexagonal) | 0.000 | 0.00 |
| $Nb_3AlC_2$ | $P6_3/mmc$ (Hexagonal) | 0.000 | 0.00 |
| $V_3AlC_2$ | $P6_3/mmc$ (Hexagonal) | ~0 | <0.1 |
| $Ti_3ZnC_2$ | $P6_3/mmc$ (Hexagonal) | ~0 | <0.1 |
| $Zr_3AlC_2$ | $P6_3/mmc$ (Hexagonal) | ~0 | <0.1 |
| $Ti_4SiC_3$ | $P6_3/mmc$ (Hexagonal) | ~0 | <0.1 |
| $Ti_4AlN_3$ | $P6_3/mmc$ (Hexagonal) | 0.000 | 0.00 |
| $Nb_4AlC_3$ | $P6_3/mmc$ (Hexagonal) | 0.007 | 0.00 |
| $V_4AlC_3$ | $P6_3/mmc$ (Hexagonal) | 0.012 | 0.00 |

As shown in Table 3, three of the compounds exhibit energy above the convex hull ($E_{hull}$) greater than 0 (these values are bolded). These compounds are thermodynamically meta-stable, and may tend to decompose depending on other factors. The remaining compounds that exhibit energy above the convex hull ($E_{hull}$) of 0.000 are thermodynamically stable. All of the compounds have a zero bandgap ($E_g=0$), meaning they are metallic and conductive, or a bandgap less than 0.1 ($E_g<0.1$), meaning they are semi-metallic. In one or more examples, as part of the thermodynamic screening of step 106 of method 100, any compound with an energy above the convex hull ($E_{hull}$) greater than 0 can be screened out. In one or more examples, as part of the thermodynamic screening of step 106, any compound with a bandgap ($E_g$) greater than 0 may be screened out.

After performing thermodynamic stability and/or conductivity screening at step 106, method 100 can move to step 108 and select one or more compositions based on the stability of the reaction products of the MAX compound's reaction with Manganese. The Manganese reaction with each of the screened MAX compounds is shown in Table 4, below.

TABLE 4

Manganese Reaction of Screened MAX Compounds

| Compound | Mn Reaction | $E_{rxn}$ (eV/atom) |
|---|---|---|
| $Ti_2AlC$ | 0.5 $Ti_2AlC$ + 0.5 Mn → 0.25 $Ti_3AlC_2$ + 0.25 $TiMn_2Al$ | −0.032 |
| $V_2AlC$ | 0.643 Mn + 0.357 $AlV_2C$ → 0.071 $V_6C_5$ + 0.071 MnAl + 0.286 $Mn_2AlV$ | −0.045 |
| $Ti_2SnC$ | Does not react with Mn | |
| $Cr_2AlC$ | 0.706 Mn + 0.294 $AlCr_2C$ → 0.059 $Cr_7C_3$ + 0.176 $Mn_2AlCr$ + 0.118 $Mn_3AlC$ | −0.043 |
| $Nb_2AlC$ | 0.741 Mn + 0.259 $Nb_2AlC$ → 0.19 MnAl + 0.069 $Mn_8Nb_3Al$ + 0.052 $Nb_6C_5$ | −0.027 |
| $Zr_2SnC$ | Does not react with Mn | |
| $Nb_2SnC$ | Does not react with Mn | |
| $Zr_2AlC$ | 0.554 Mn + 0.446 $Zr_2AlC$ → 0.069 $Zr_3Mn_8Al$ + 0.188 $ZrAl_2$ + 0.05 $Zr_{10}C_9$ | −0.034 |
| $Ti_3AlC_2$ | 0.75 Mn + 0.25 $Ti_3AlC_2$ → 0.25 $TiMn_2$ + 0.25 MnAl + 0.5 TiC | −0.001 |
| $Ti_3SiC_2$ | 0.667 Mn + 0.333 $Ti_3SiC_2$ → 0.333 $TiMn_2Si$ + 0.667 TiC | −0.048 |

TABLE 4-continued

Manganese Reaction of Screened MAX Compounds

| Compound | Mn Reaction | $E_{rxn}$ (eV/atom) |
|---|---|---|
| $Ti_3SnC_2$ | Does not react with Mn | |
| $Nb_3AlC_2$ | 0.706 Mn + 0.294 $Nb_3AlC_2$ → 0.235 MnAl + 0.059 $Mn_8Nb_3Al$ + 0.118 $Nb_6C_5$ | −0.019 |
| $Ti_4AlN_3$ | Does not react with Mn | |
| $Nb_4AlC_3$ | 0.659 Mn + 0.341 $Nb_4AlC_3$ → 0.295 MnAl + 0.045 $Mn_8Nb_3Al$ + 0.205 $Nb_6C_5$ | −0.022 |
| $V_4AlC_3$ | 0.583 Mn + 0.417 $AlV_4C_3$ → 0.25 $V_6C_5$ + 0.25 MnAl + 0.167 $Mn_2AlV$ | −0.040 |

The reaction products of the MAX compounds reacting with Manganese can be categorized into: (1) Carbides, (2) Binary intermetallics, and (3) Ternary intermetallics. The Carbide reaction products of Table 4 include $V_6C_5$, $Cr_7C_3$, $Nb_6C_5$, $Zr_{10}C_9$, TiC, and $Mn_3AlC$. The Binary intermetallic reaction products of Table 4 include MnAl, $ZrAl_2$, a $TiMn_2$. The Ternary intermetallic reaction products of Table 4 include $Mn_2AlV$, $Mn_2AlCr$, $TiMn_2Si$, $Mn_8Nb_3Al$, and $Zr_3Mn_8Al$.

In one or more examples, selecting MAX compounds at step 108 can include assessing the thermodynamic stability (based on $E_{hull}$ and/or a Pourbaix diagram) and/or conductivity ($E_g$) of the reaction products. To assess the stability of the carbide products, the energy above the convex hull ($E_{hull}$) and bandgap ($E_g$) of the Carbide reaction products are shown below in Table 5.

TABLE 5

Stability Screening of Carbide Reaction Products.

| Compound | $E_{hull}$ (eV/atom) | $E_g$ (eV/atom) | Reaction with Li metal |
|---|---|---|---|
| $V_6C_5$ | 0.000 | 0.00 | Does not react |
| $Cr_7C_3$ | 0.000 | 0.00 | Does not react |
| $Nb_6C_5$ | 0.000 | 0.00 | Does not react |
| $Zr_{10}C_9$ | 0.000 | 0.00 | Does not react |
| TiC | 0.000 | 0.00 | Does not react |
| $Mn_3AlC$ | 0.000 | 0.00 | Does not react |

As shown in Table 5 above, each of the Carbide reaction products is thermodynamically stable ($E_{hull}=0$), conductive ($E_g=0$), and does not consume Lithium ions. It is important that the reaction product not consume Lithium ions in a Lithium-ion battery because the total amount of lithium ions in the given battery system is limited and consumed lithium may not be reversibly used for the next charge/discharge cycle. This means that the total capacity of the cell may decrease by the side reactions. Accordingly, each of the Carbide reaction products exhibit high stability, which is ideal for use as an additive material in a lithium ion battery.

As noted above, thermodynamic stability can also be assessed via a Pourbaix diagram, which plots the possible thermodynamically stable phases of an aqueous electrochemical system. The y-axis of a Pourbaix diagram indicates the electrochemical voltage vs. standard hydrogen electrode (SHE). When the value of electrochemical voltage vs. SHE is 0 to 1 V (here, 1.23 V to be exact), this typically corresponds to stability of $H_2O$. The $Li/Li^+$ system is about −3.04 V vs. SHE. For example, $LiFePO_4$ is about 3.5 V vs. Li/Li and $LiMnPO_4$ is about 4.0 V vs. $Li/Li^+$. This means that $LiFePO_4$ is about 0.46 V vs. SHE and $LiMnPO_4$ is about 0.96 V vs. SHE. Notably, although Pourbaix diagrams plot thermodynamic stability of aqueous systems, they can be useful as an indicator of stability even in non-aqueous systems, like lithium ion batteries that use organic solvent liquid electrolytes.

Figure 2:
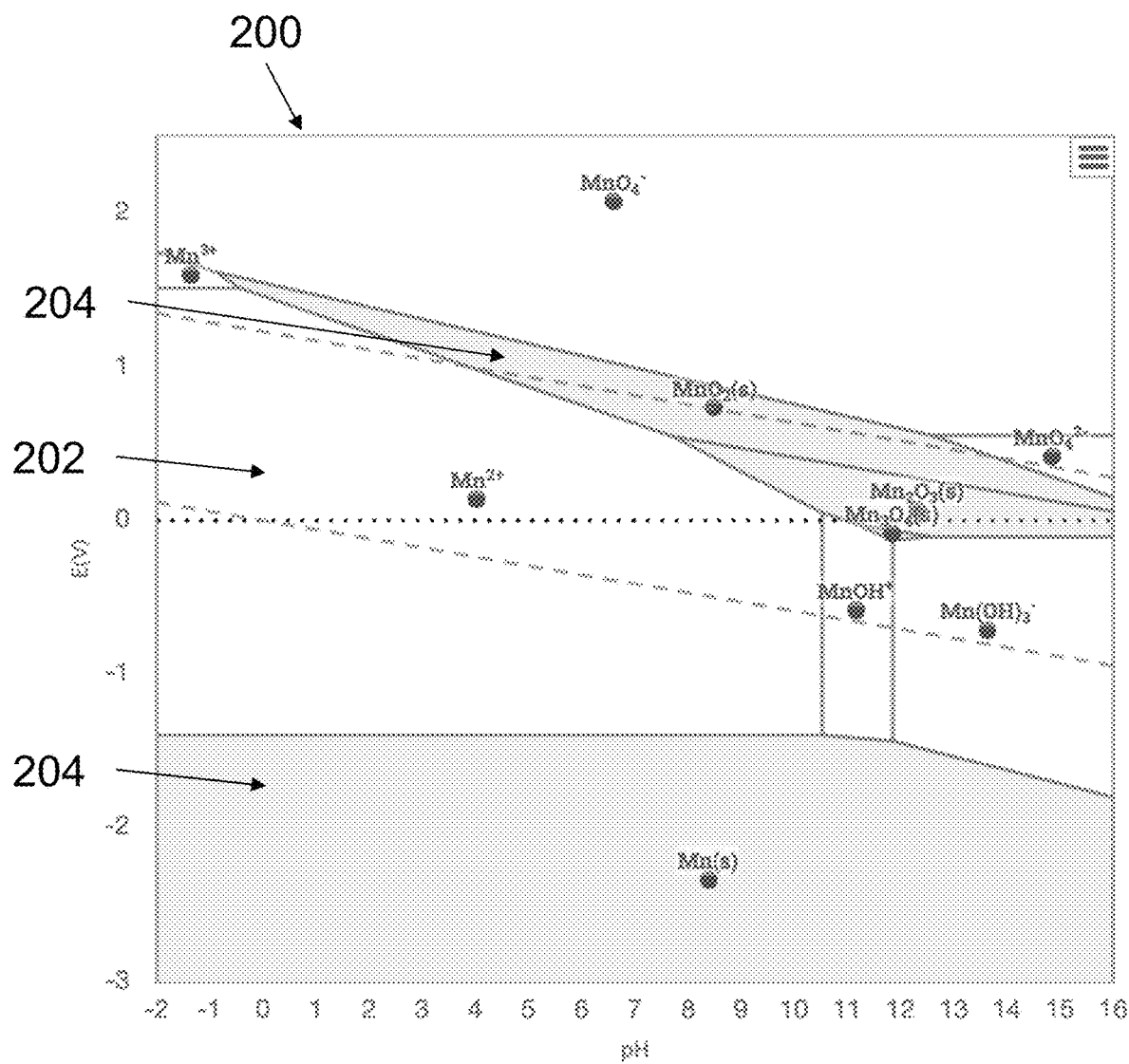
FIG. 2 illustrates a Pourbaix diagram of a pure Manganese system, in accordance with some embodiments disclosed herein.

FIG. 2 illustrates a Pourbaix diagram 200 of a pure Manganese system, in accordance with some embodiments disclosed herein. The diagram 200 plots voltage potential in SHE along the Y axis and pH along the X axis. The diagram 200 distinguishes between aqueous regions 202 and solid regions 204 based on shading. That is, the solid regions 204 are shaded more darkly than the aqueous regions 202 of the Manganese system. Here, diagram 200 is provided as a baseline to compare against the Pourbaix diagrams of the Binary intermetallic reaction products and Ternary intermetallic reaction products.

Figure 3A:
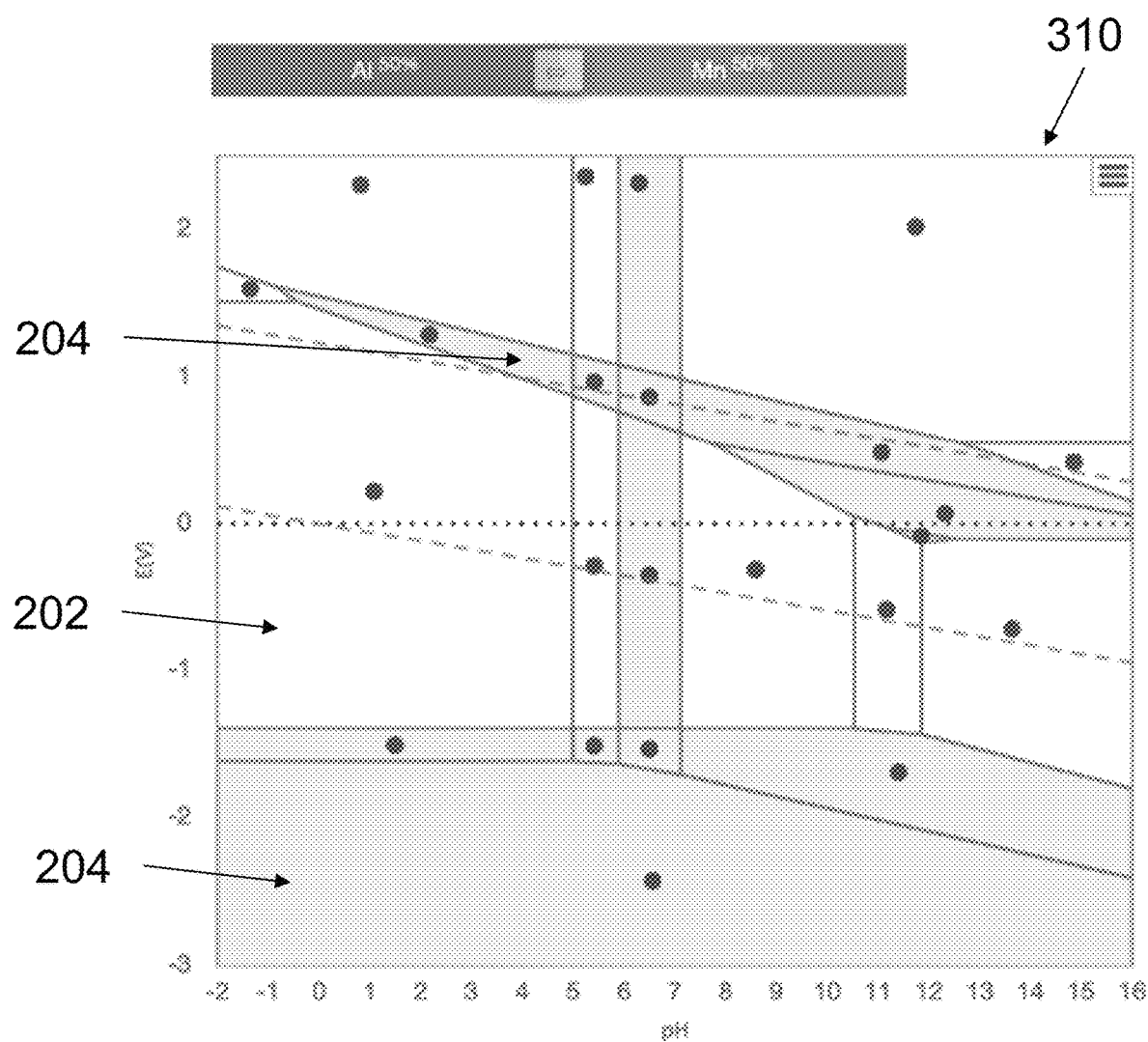
FIGS. 3A-3C illustrate Pourbaix diagrams of exemplary Binary intermetallic MAX compound reaction products, in accordance with some embodiments disclosed herein.
Figure 3B:
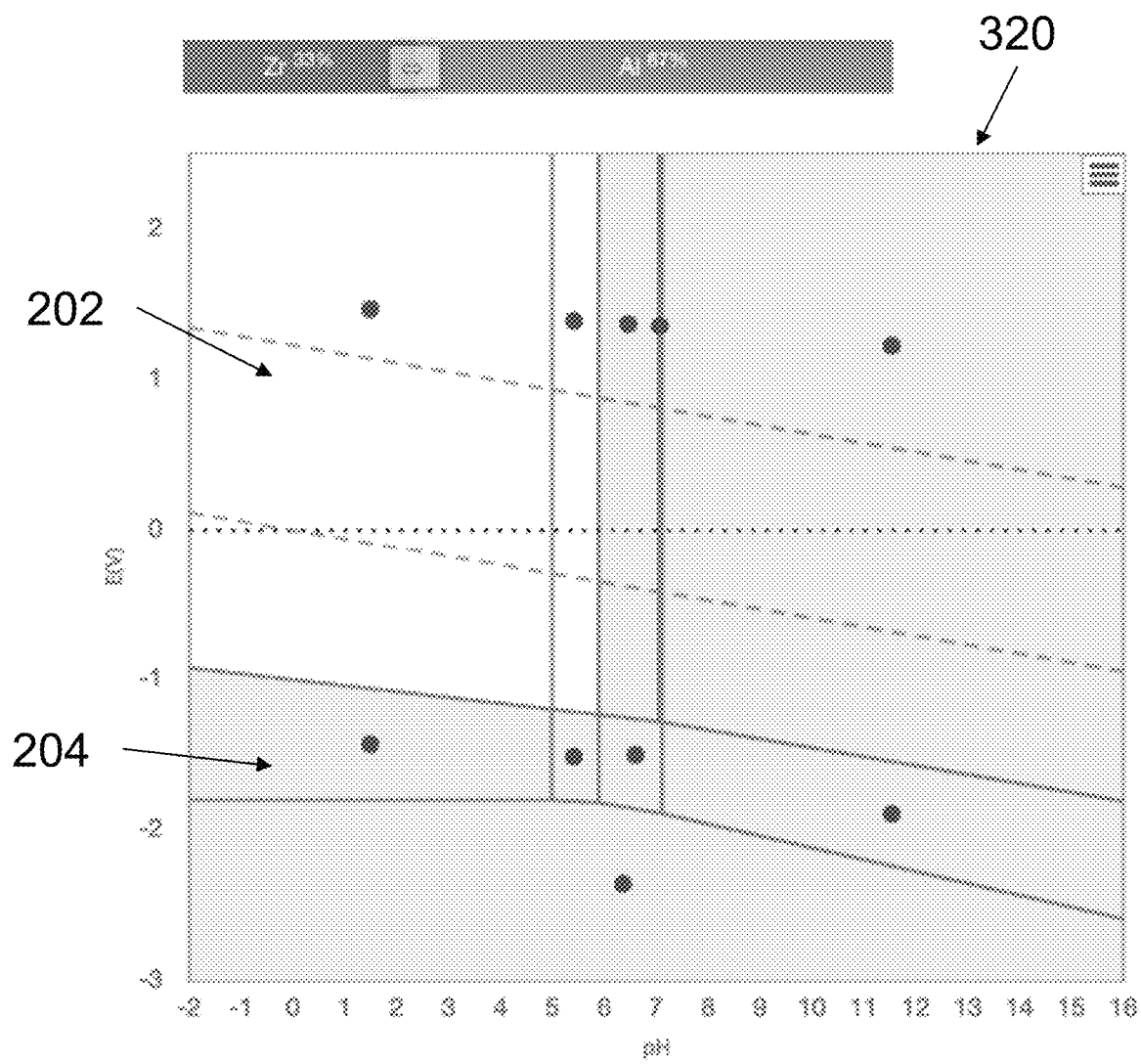
Figure 3C:
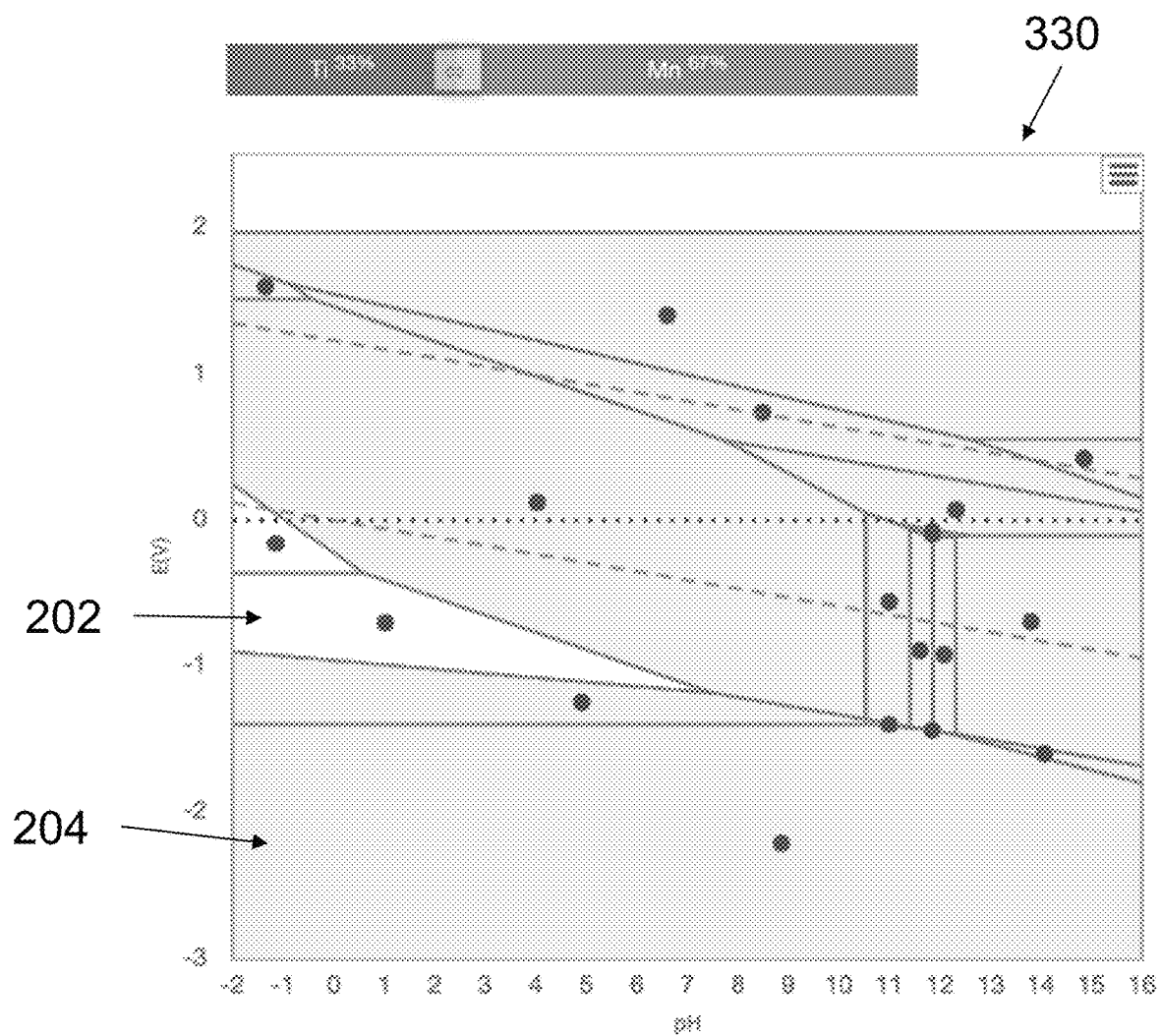

FIGS. 3A-C illustrate Pourbaix diagrams of exemplary Binary intermetallic MAX compound reaction products, in accordance with some embodiments disclosed herein. More specifically, FIG. 3A illustrates a Pourbaix diagram 310 of an MnAl compound, FIG. 3B illustrates a Pourbaix diagram 320 of a $ZrAl_2$ compound, and FIG. 3C illustrates a Pourbaix diagram 330 of a $TiMn_2$ compound. Each of diagram 310, diagram 320, and diagram 330 distinguishes between solid regions 204 and aqueous regions 202 using shading, as discussed above with respect to diagram 200 of the pure Manganese system.

Comparing first the diagram 310 of FIG. 3A with diagram 200 of FIG. 2, the MnAl compound of diagram 310 exhibits more solid regions 204 than the Manganese system of diagram 200. The solid region 204 located below −1.5 V vs. SHE corresponds to about 1.5 V vs. $Li/Li^+$. The solid region 204 located above 0 V vs. SHE corresponds to about 3 V vs. $Li/Li^+$. Accordingly, the MnAl compound generally will be more stable (e.g., more likely to be solid than aqueous or in dissolved form) than the pure Manganese system, for example in a nonaqueous system like a lithium-ion battery system. Similarly, the diagram 320 of FIG. 3B illustrates that the $ZrAl_2$ compound is far more likely to be solid than a pure Manganese system, as evidenced by the large area of solid regions 204 relative to aqueous regions 202 of diagram 320. Relative to diagram 310 of FIG. 3A, diagram 320 also exhibits more solid regions 204 relative to aqueous regions 202, indicating that $ZrAl_2$ also more likely to be more stable than the MnAl compound. This is shown even further in diagram 330 of FIG. 3C, which contains only a relatively small aqueous region 202. In these cases, there is less chance of Mn dissolution in the Li-ion battery operating voltage regions, relative to the chance of Mn dissolution when relying on a purely Manganese system. Accordingly, each of the Binary intermetallic reaction products is more stable than a pure Manganese system and thus have less chance of metal dissolution.

Figure 4A:
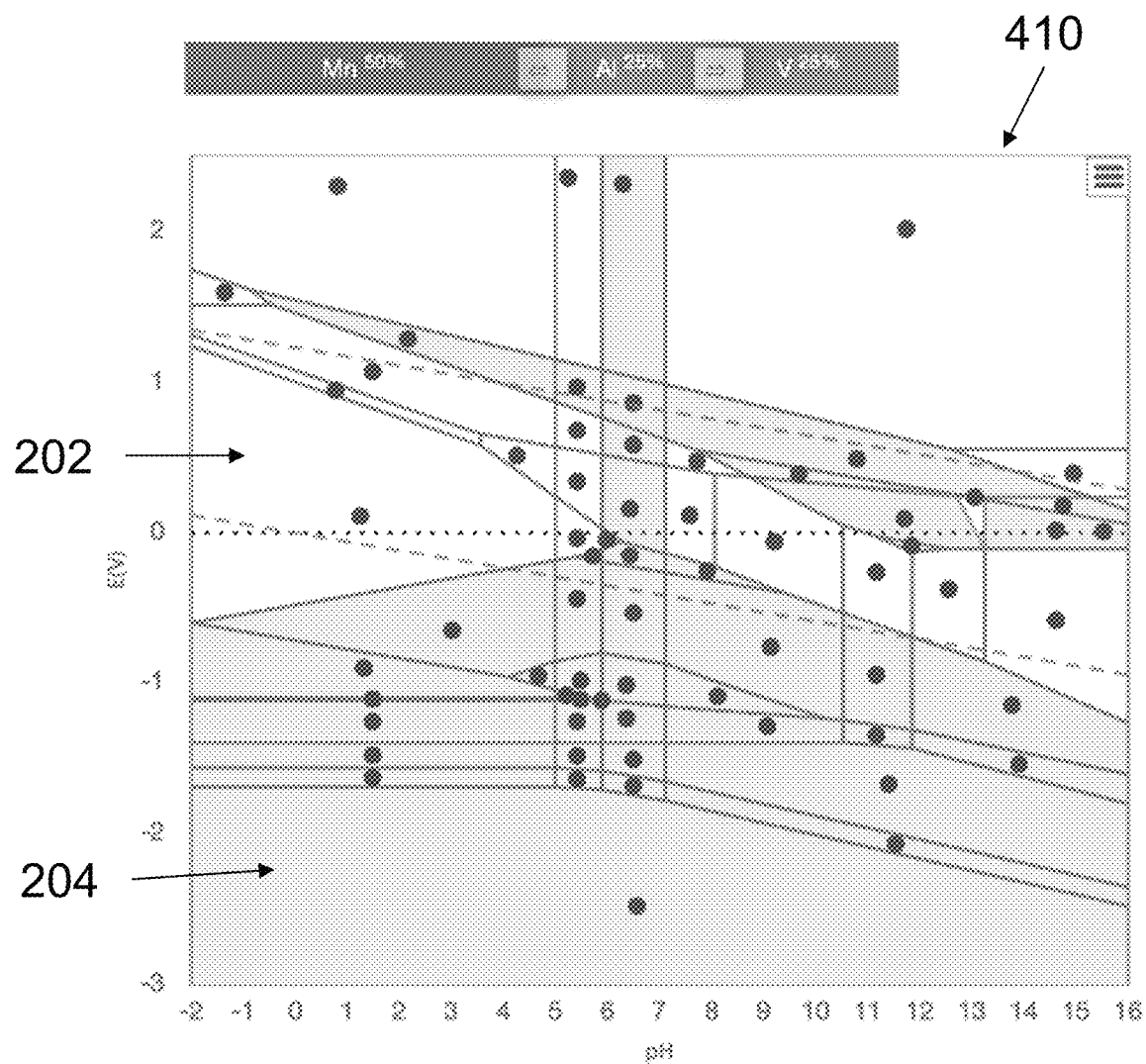
FIGS. 4A-4E illustrate Pourbaix diagrams of exemplary Ternary intermetallic MAX compound reaction products, in accordance with some embodiments disclosed herein.
Figure 4B:
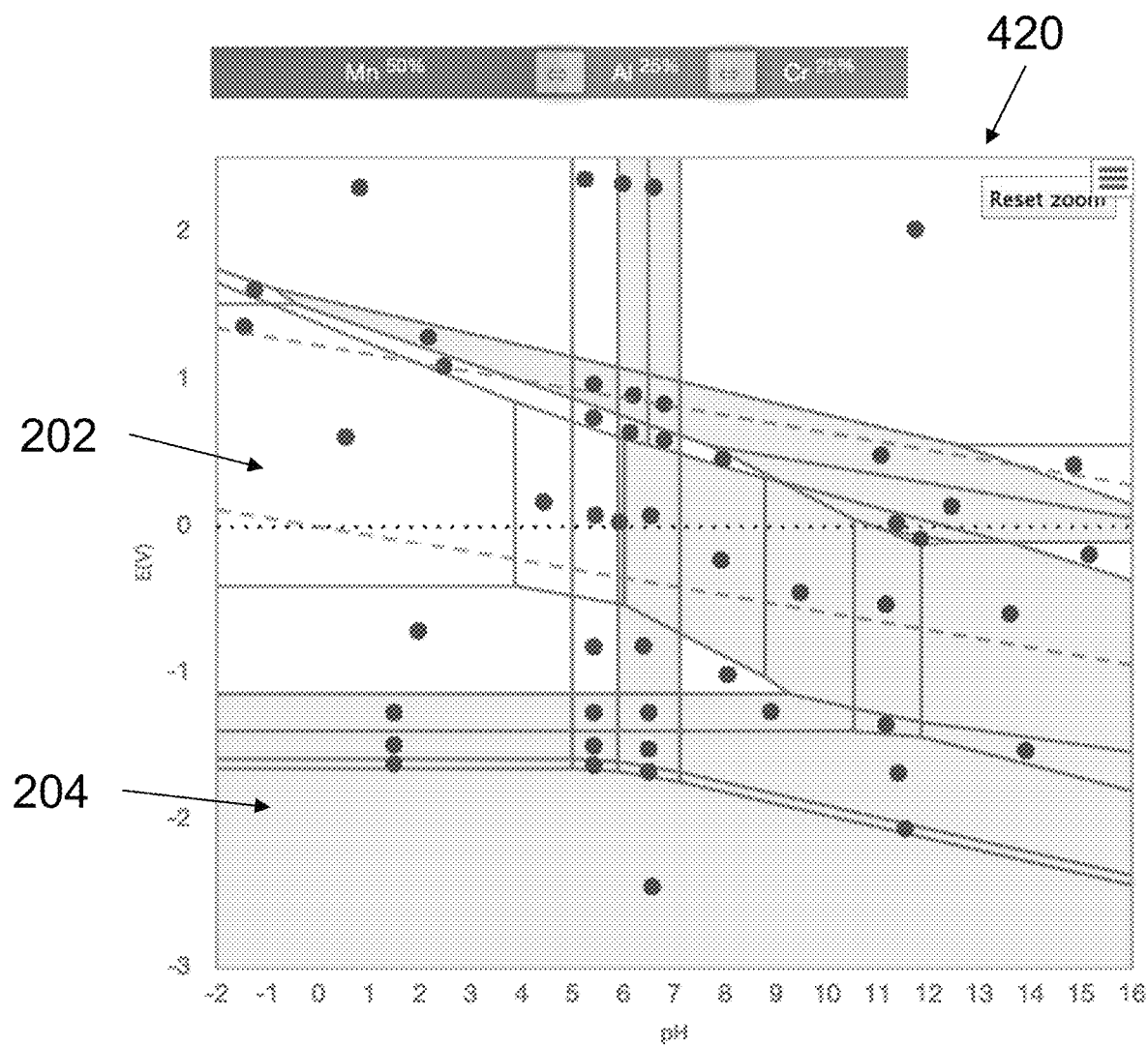
Figure 4C:
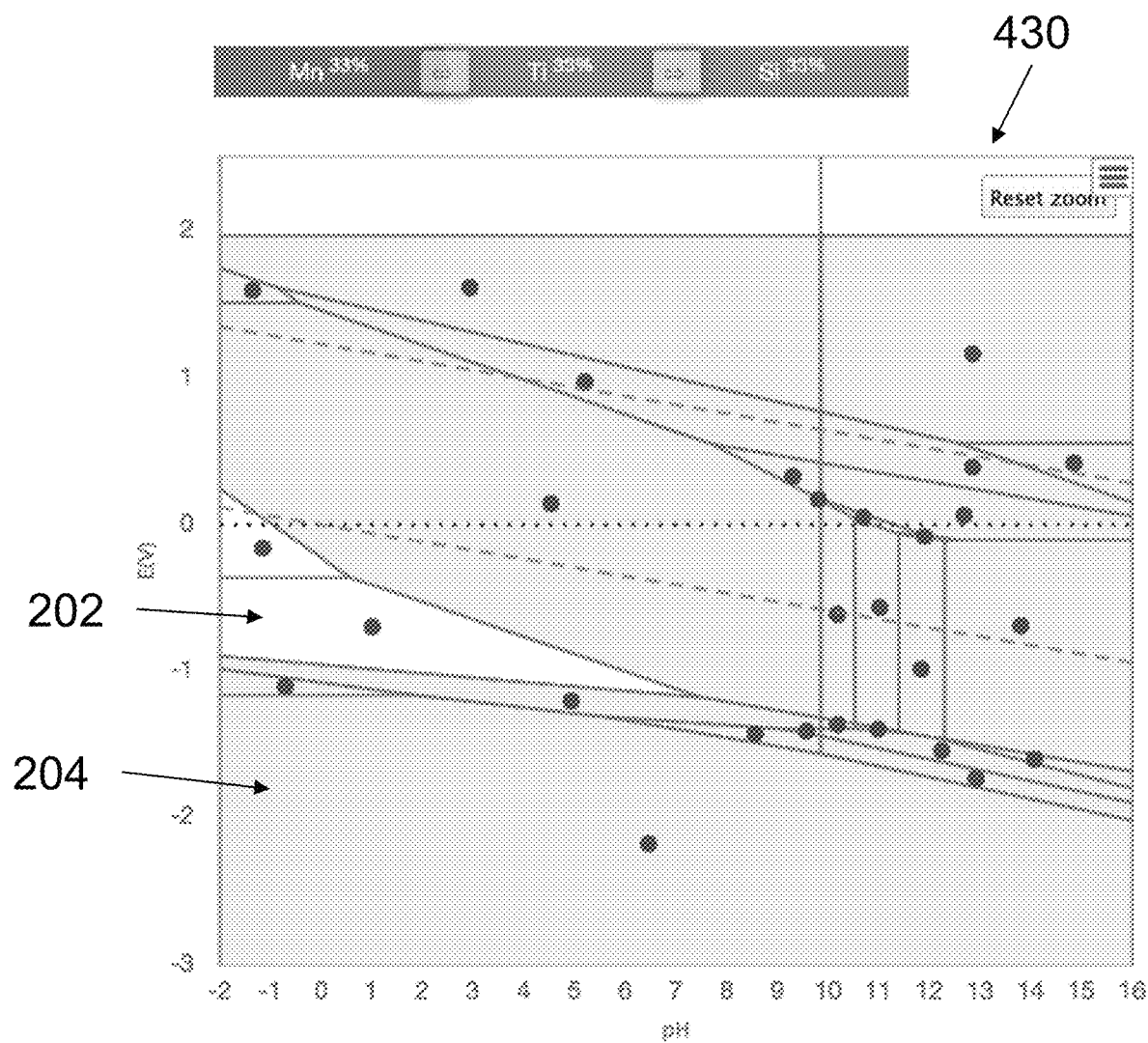
Figure 4D:
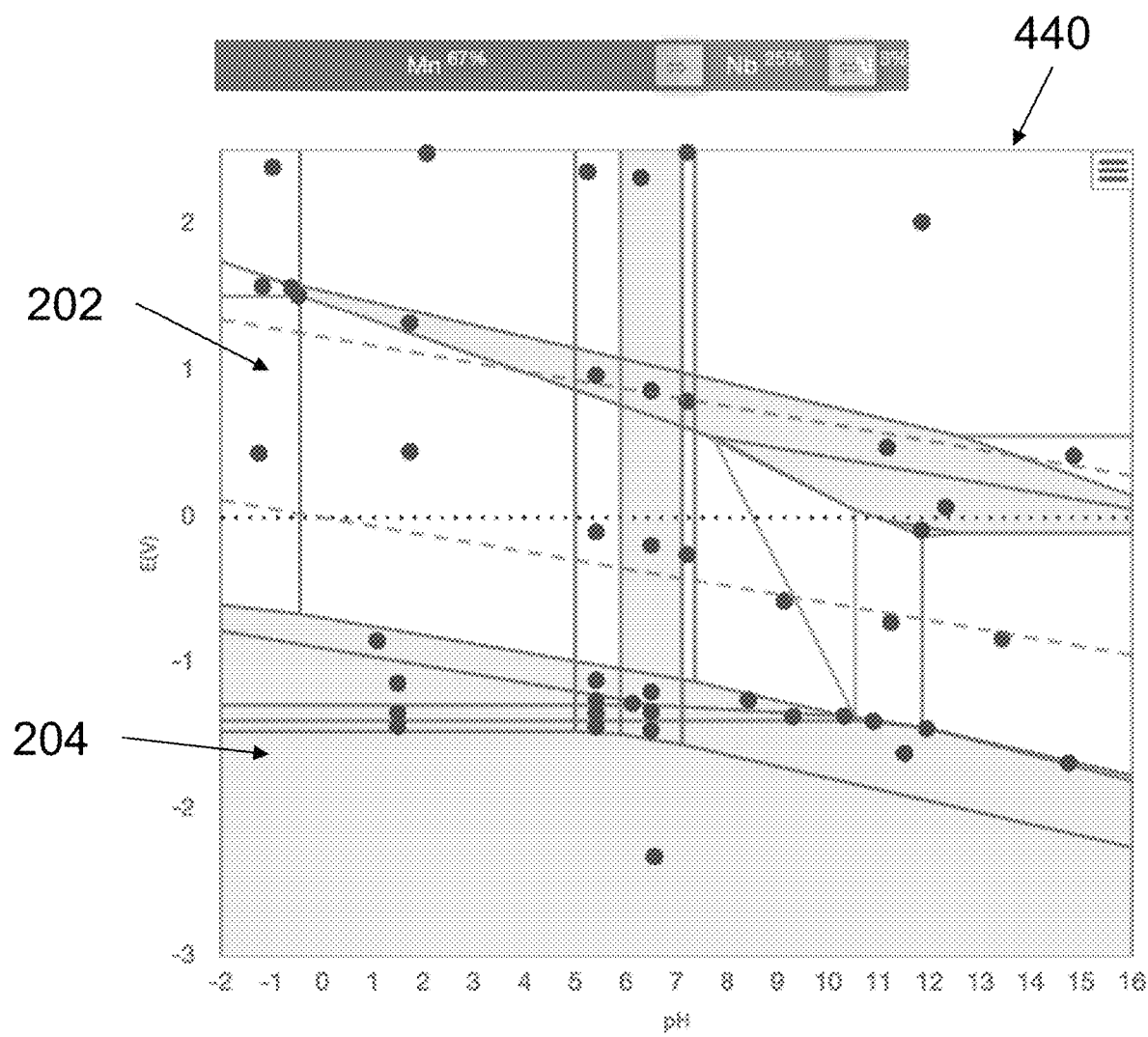
Figure 4E:
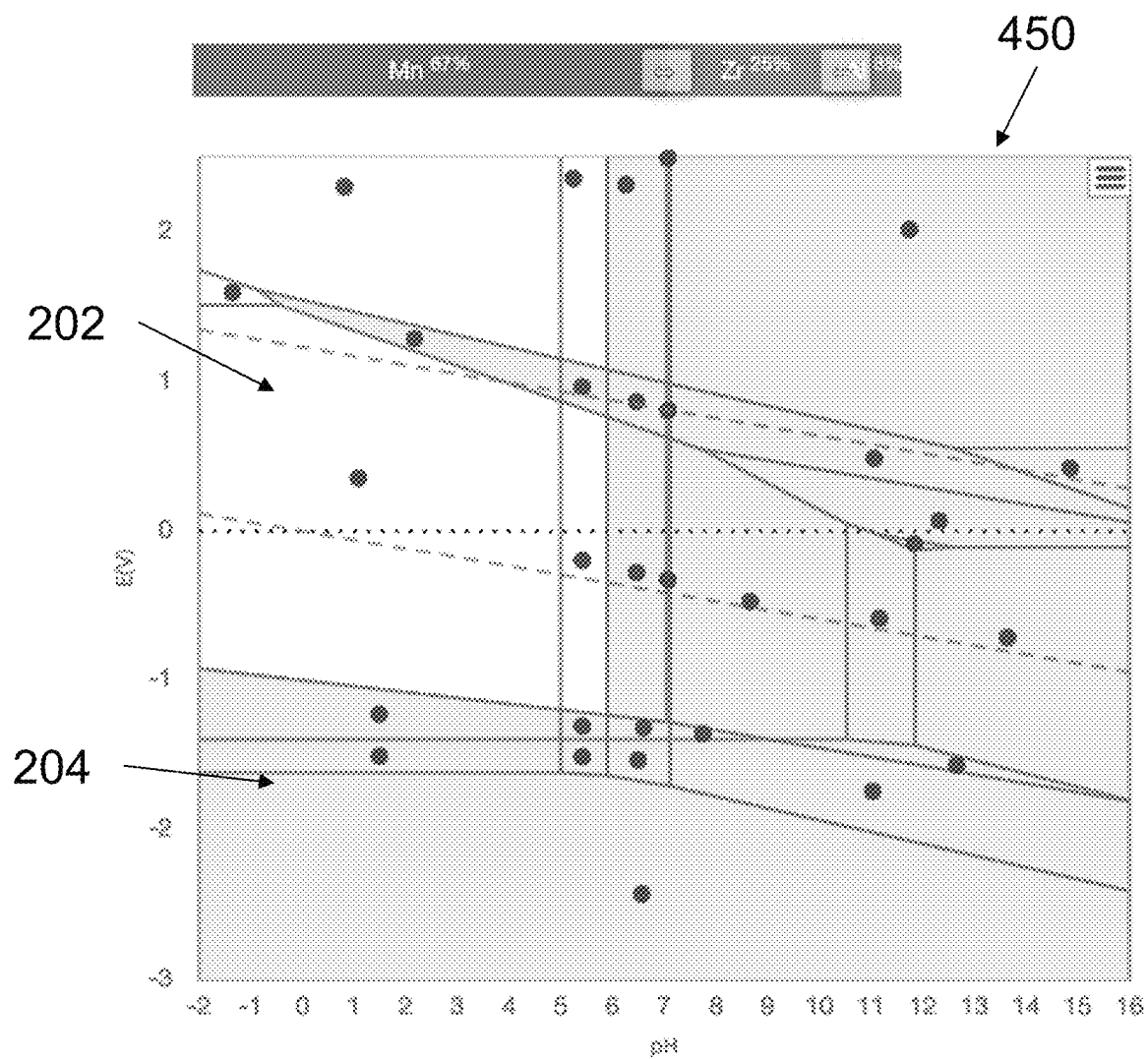

FIGS. 4A-E illustrate Pourbaix diagrams of exemplary Ternary intermetallic MAX compound reaction products, in accordance with some embodiments disclosed herein. More specifically, FIG. 4A illustrates a Pourbaix diagram 410 of an $Mn_2AlV$ compound, FIG. 4B illustrates a Pourbaix diagram 420 of an $Mn_2AlCr$ compound, FIG. 4C illustrates a Pourbaix diagram 430 of a $TiMn_2Si$ compound, FIG. 4D illustrates a Pourbaix diagram 440 of an $Mn_5Nb_3Al$ compound, and FIG. 4E illustrates a Pourbaix diagram 450 of a $Zr_3Mn_8Al$ compound. As above, each of diagram 410, diagram 420, diagram 430, diagram 440, and diagram 450 distinguishes between solid regions 204 and aqueous regions 202 using shading.

Beginning first with diagram 410 of FIG. 4A, the $Mn_2AlV$ compound exhibits larger solid regions 204 relative to aqueous regions 202 than the diagram 200 of FIG. 2 representing the pure Manganese system. The same is true of each of FIGS. 4B-4E, meaning that each of the Ternary intermetallic reaction products shown is more stable than a pure Manganese system, and thus have less chance of metal ion dissolution.

Returning now to step 108 of FIG. 1, as noted above, selecting MAX compounds at step 108 can include assessing the thermodynamic stability (based on $E_{hull}$ and/or a Pourbaix diagram) and/or conductivity ($E_g$) of the reaction products. In one or more examples, the thermodynamic stability of the reaction products can be used when selecting a MAX composition at step 108 to rank the reaction products based on their stability. Optionally, the most stable reaction products can be ranked most favorably.

In one or more examples, the MAX composition containing the most stable reaction products when reacting with Manganese can be selected at step 108. For example, $Cr_2AlC$ can be selected at step 108, based on the stability of the reaction products $Cr_2C_3$ (one of the Carbide reaction products of Table 5), $Mn_2AlCr$ (a Ternary intermetallic compound with Pourbaix diagram 420 of FIG. 4B), and $Mn_3AlC$ (another Carbide reaction product of Table 5). In one or more examples, $Cr_2AlC$, $Ti_3SiC_2$, and $Zr_2AlC$ can be categorized as Tier 1 MAX compounds at step 108. In one or more examples, $V_2AlC$ and $Ti_3AlC_2$ can be categorized as Tier 2 MAX compounds at step 108. In one or more examples, $Nb_2AlC$, $Nb_3AlC_2$, $Nb_4AlC_3$, and $V_4AlC_3$ can be categorized as Tier 3 MAX compounds at step 108.

Figure 5:
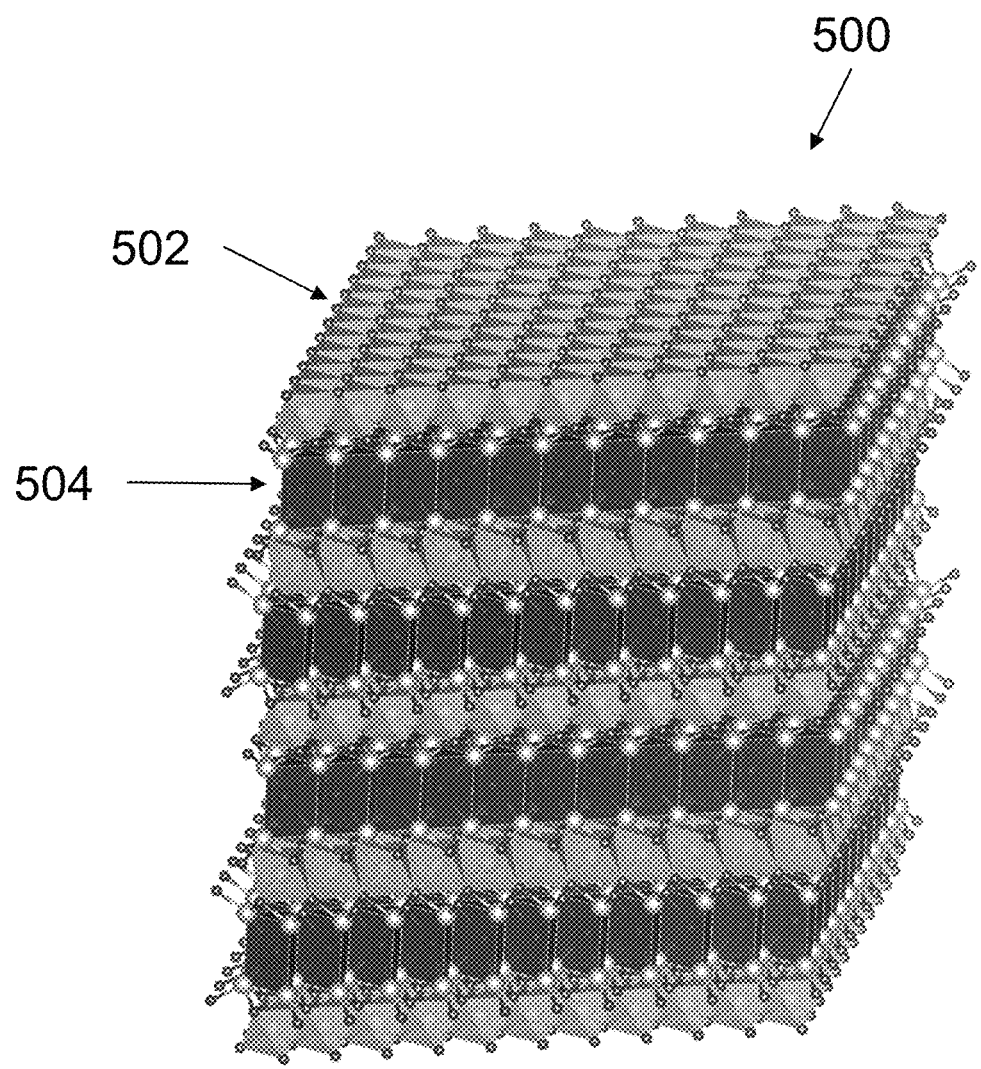
FIG. 5 illustrates an exemplary MAX compound structure of an additive for lithium-ion batteries, in accordance with some embodiments disclosed herein.

FIG. 5 illustrates an exemplary MAX compound 500 of an additive for lithium-ion batteries, in accordance with some embodiments disclosed herein. The compound 500 can include any of the compounds identified via method 100 of FIG. 1, such as any of the compounds selected via step 108 of method 100. In one or more examples, the compound 500 comprises a layered structure, made up of a number of layers 502, 504. The compound 500 has a hexagonal $P6_3/mmc$ space group. In one or more examples, the compound 500 has edge-sharing, distorted $XM_6$ octahedra interleaved by single planar layers of the A element of the compound. For instance, if the MAX compound is $Cr_2AlC$, the compound 500 can include single planar layers of Al interleaved with distorted $XM_6$ octahedra of the Cr and C elements.

Battery Cells, Battery Modules, Battery Packs, and Electric Vehicle Systems

One or more MAX compounds, as identified via method 100 of FIG. 1, can be incorporated into a battery cell, which can be used as an electrical energy source. For example, one or more MAX compounds can be integrated together within the layered structure of an electrode, such as mixed with the bulk form or as a thin film, as will be discussed further below.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, additives, MAX compounds, etc., described herein can be implemented into the battery cells, battery modules, battery packs, and methods of making these battery cells, battery modules, and battery packs.

Figure 6:
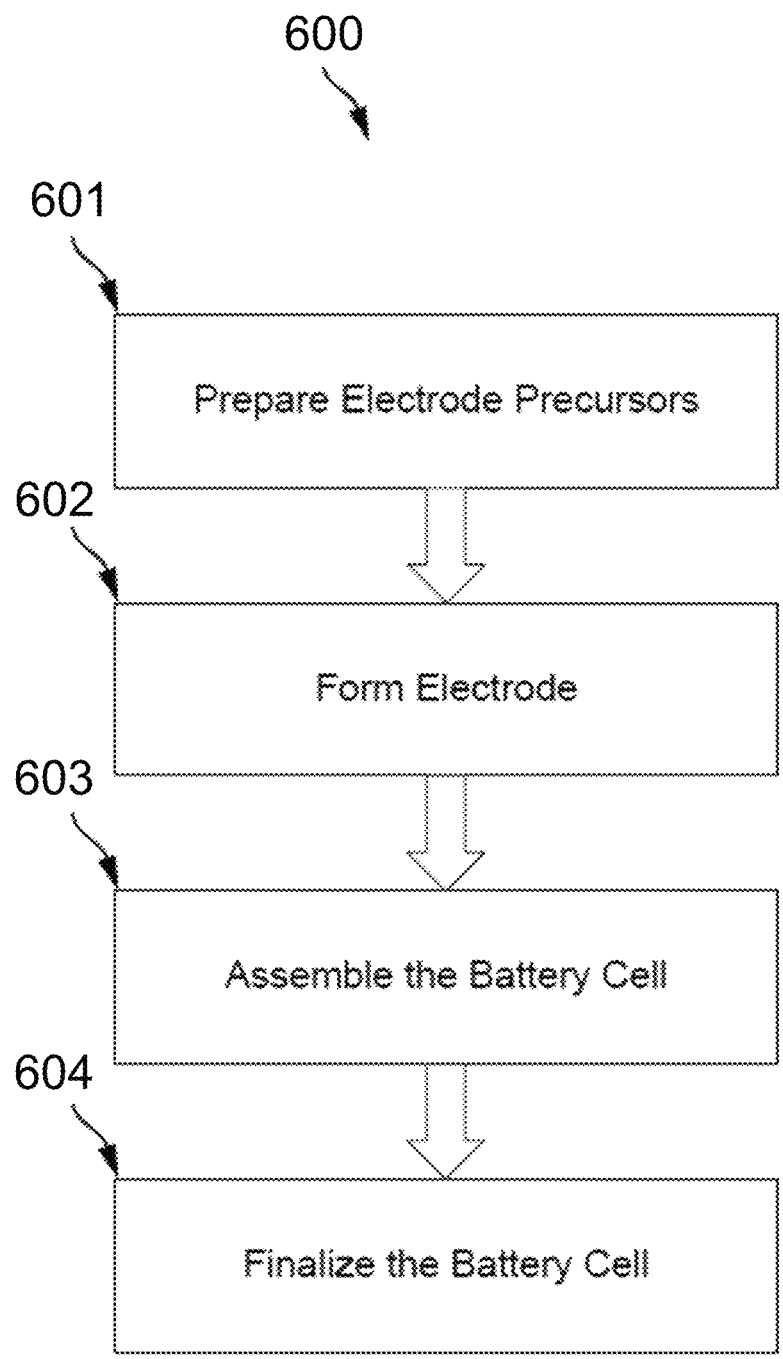
FIG. 6 illustrates a flow chart for a typical battery cell manufacturing process in accordance with some embodiments disclosed herein.

FIG. 6 illustrates a flow chart for a typical battery cell manufacturing process 600. These steps are not exhaustive and other battery cell manufacturing processes can include additional steps or only a subset of these steps. At step 601, the electrode precursors (e.g., binder, active material, conductive carbon additive) can be prepared. In some embodiments, this step can include mixing electrode active materials with additional components (e.g., binders, solvents, conductive additives, etc.) to form an electrode slurry. In some embodiments, this step can include synthesizing the electrode active materials themselves. In one or more examples, one or more MAX compounds can be included when preparing the electrode precursors at step 601. For example, the MAX compounds may be physically blended during preparation of the electrode slurry. In another embodiment, the MAX compounds may be deposited on the electrode active materials using deposition techniques including but not limited to chemical vapor deposition (CVD), physical vapor deposition (PVD), laser deposition, atomic layer deposition (ALD), etc.

At step 602, the electrode can be formed. In some embodiments, this step can include coating an electrode slurry on a current collector. In some embodiments, the electrode or electrode layer can include electrode active materials, conductive carbon material, binders, and/or other additives. In one or more examples, one or more MAX compounds can be included in the electrode layer. For example, one or more MAX compounds can be integrated together with a layered structure within the bulk form or deposited as a thin film.

In some embodiments, the electrode active materials can include cathode active materials. In some embodiments, the cathode active materials can include olivine or phosphate-based cathode active materials. In some embodiments, the cathode active materials can include over-lithiated-oxide material (OLO), nickel-based cathode materials (e.g., nickel manganese cobalt (NMC) such as NMC111, NMC523, NMC622, NMC811, NMCA, nickel cobalt aluminum oxide (NCA), and Ni90+). In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium cobalt oxide (LCO), lithium manganese oxide (LMO), lithium metal phosphates like lithium iron phosphate ("LFP"), lithium iron manganese phosphate ("LMFP"), sulfur containing cathode materials, lithium sulfide ($Li_2S$), lithium polysulfides, titanium disulfide ($TiS_2$), and combinations thereof. In some embodiments, the cathode active materials can include one or more of $LiMO_2$, $Li_{1+x}M_{1-x}O_2$, and $Li_2MnO_3$. In one or more examples, the cathode active materials can include one or more MAX compounds.

In some embodiments, the electrode active materials can include anode active materials. In some embodiments, the anode active materials can include graphitic carbon (e.g., ordered or disordered carbon with $sp^2$ hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell may not comprise an anode active material in an uncharged state. Optionally, the separator of the assembled cell can include one or more MAX compounds.

In one or more examples, the anode active materials can include one or more MAX compounds. For example, one or more MAX compounds can be mixed with the anode active materials. Optionally, the one or more MAX compounds can be incorporated into the anode active materials in layered manner.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof.

In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, solid electrolyte materials of the solid electrolyte layer can include inorganic solid electrolyte materials such as oxides, sulfides, phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$), among others, or in any combinations thereof. In some embodiments, the solid electrolyte layer can include a glassy, ceramic and/or crystalline electrolyte material such as $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, lithium phosphorous oxy-nitride ($Li_xPO_yN_z$), lithium germanium phosphate sulfur ($Li_{10}GeP_2Si_2$), Yttria-stabilized Zirconia (YSZ), NASICON ($Na_3Zr_2Si_2PO_{12}$), betaalumina solid electrolyte (BASE), perovskite ceramics (e.g., strontium titanate ($SrTiO_3$)), Lithium lanthanum zirconium oxide ($La_3Li_7O_{12}Zr_2$), LiSiCON ($Li_{2+2x}Zn_{1-x}GeO_4$), lithium lanthanum titanate ($Li_{3x}La_{2/3-x}TiO_3$) and/or sulfide-based lithium argyrodites with formula $Li_6PS_5X$ (X=Cl, Br) like $Li_6PS_5Cl$, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), and PEG, among others, or in any combinations thereof.

At step 603, the battery cell can be assembled. After the electrodes, separators, and/or electrolytes have been prepared, a battery cell can be assembled/prepared. In this step, the separator and/or an electrolyte layer can be assembled between the anode and cathode layers to form the internal structure of a battery cell. These layers can be assembled by a winding method such as a round winding or prismatic/flat winding, a stacking method, or a z-folding method. In one or more examples, the MAX compound, which can be added to one or more of the electrodes (e.g., the anode active materials and/or cathode active materials), a separator, deposited as a thin film, etc. as described above, can make up 0.1-10 wt. % of the assembled battery cell. Optionally, the MAX compound can make up more than 10 wt. % of the assembled battery cell.

The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 5 M, or for example salt may be present between about 0.05 to 2 M or about 0.1 to 2 M.

Figure 7:
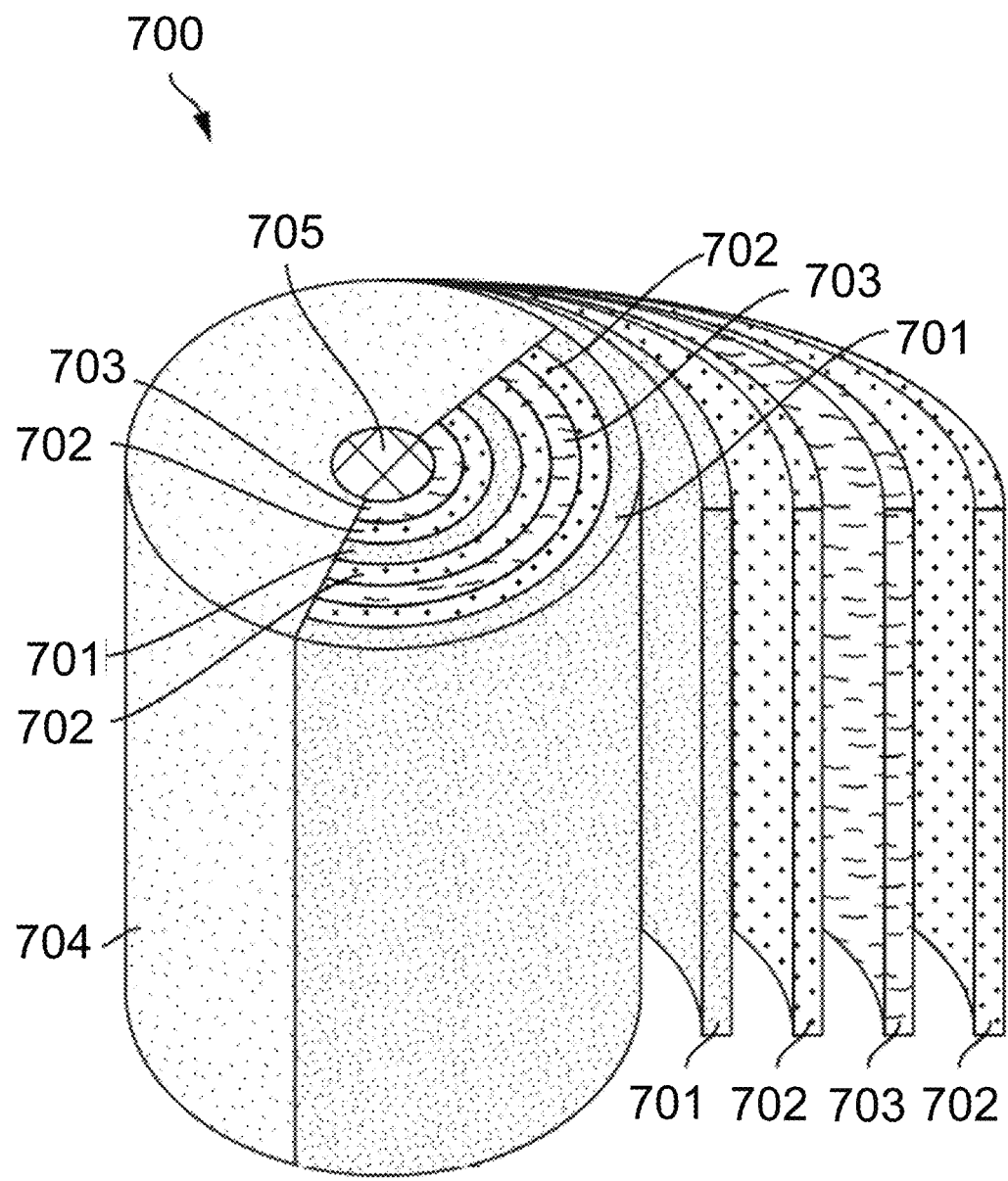
FIG. 7 depicts an illustrative example of a cross sectional view of a cylindrical battery cell in accordance with some embodiments disclosed herein.

FIG. 7 depicts an illustrative example of a cross sectional view of a cylindrical battery cell 700. The cylindrical battery cell can include layers (e.g., sheet-like layers) of anode layers 701, separator and/or electrolyte layers 702, and cathode layers 703. Optionally, the cylindrical battery cell 700 can include a sheet-like layer of a MAX compound within the anode layer 701 and/or cathode layers 703.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, MAX compound, separator/electrolyte layers) can be sandwiched, rolled up, and/or packed into a cavity of a cylinder-shaped casing 704 (e.g., a metal can). The casings/housings can be rigid such as those made from metallic or hard-plastic, for example. In some embodiments, a separator layer (and/or electrolyte layer) 702 can be arranged between an anode layer 701 and a cathode layer 703 to separate the anode layer 702 and the cathode layer 703. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 702 can prevent contact between the anode and cathode layers while facilitating ion (e.g., lithium ions) transport in the cell. The battery cell can also include at least one terminal 705. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 8:
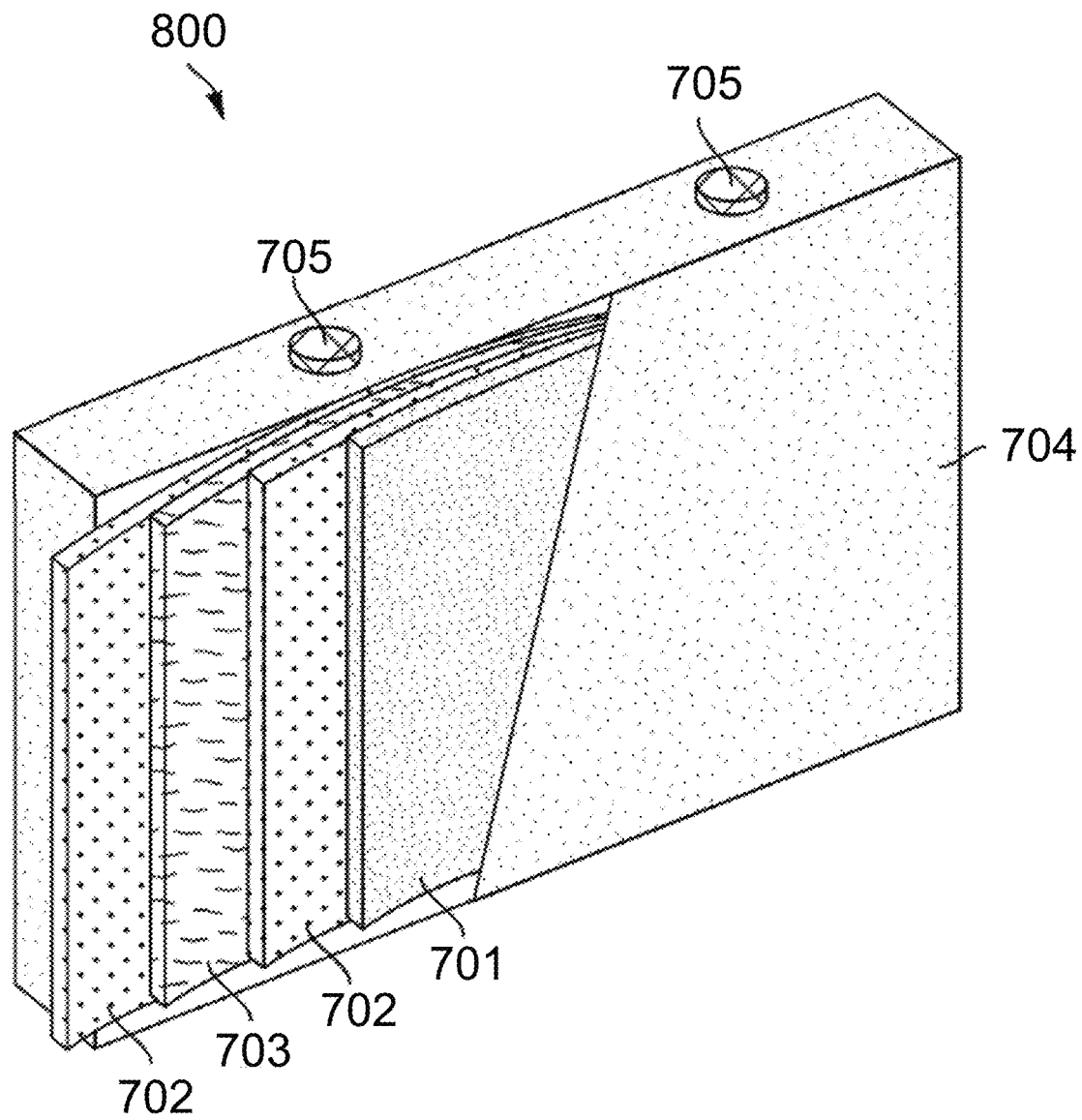
FIG. 8 depicts an illustrative example of a cross sectional view of a prismatic battery cell in accordance with some embodiments disclosed herein.

FIG. 8 depicts an illustrative example of a cross sectional view of a prismatic battery cell 800. The prismatic battery cell can include layers (e.g., sheet-like layers) of anode layers 701, separator and/or electrolyte layers 702, and cathode layers 703. Optionally, the battery cell can include one or more MAX compound layers, within the anode layer 701 and/or cathode layers 703. Similar to the cylindrical battery cell, the layers of a prismatic battery cell can be sandwiched, rolled, and/or pressed to fit into cubic or rectangular cuboid (e.g., hyperrectangle) shaped casing/housing 704. In some embodiments, the layers can be assembled by layer stacking rather than jelly rolling. In some embodiments, the casing or housing can be rigid such as those made from a metal and/or hard-plastic. In some embodiments, the prismatic battery cell 800 can include more than one terminal 705. In some embodiments, one of these terminals can be the positive terminal and the other a negative terminal. These terminals can be used to connect a load or charger to the battery cell.

Figure 9:
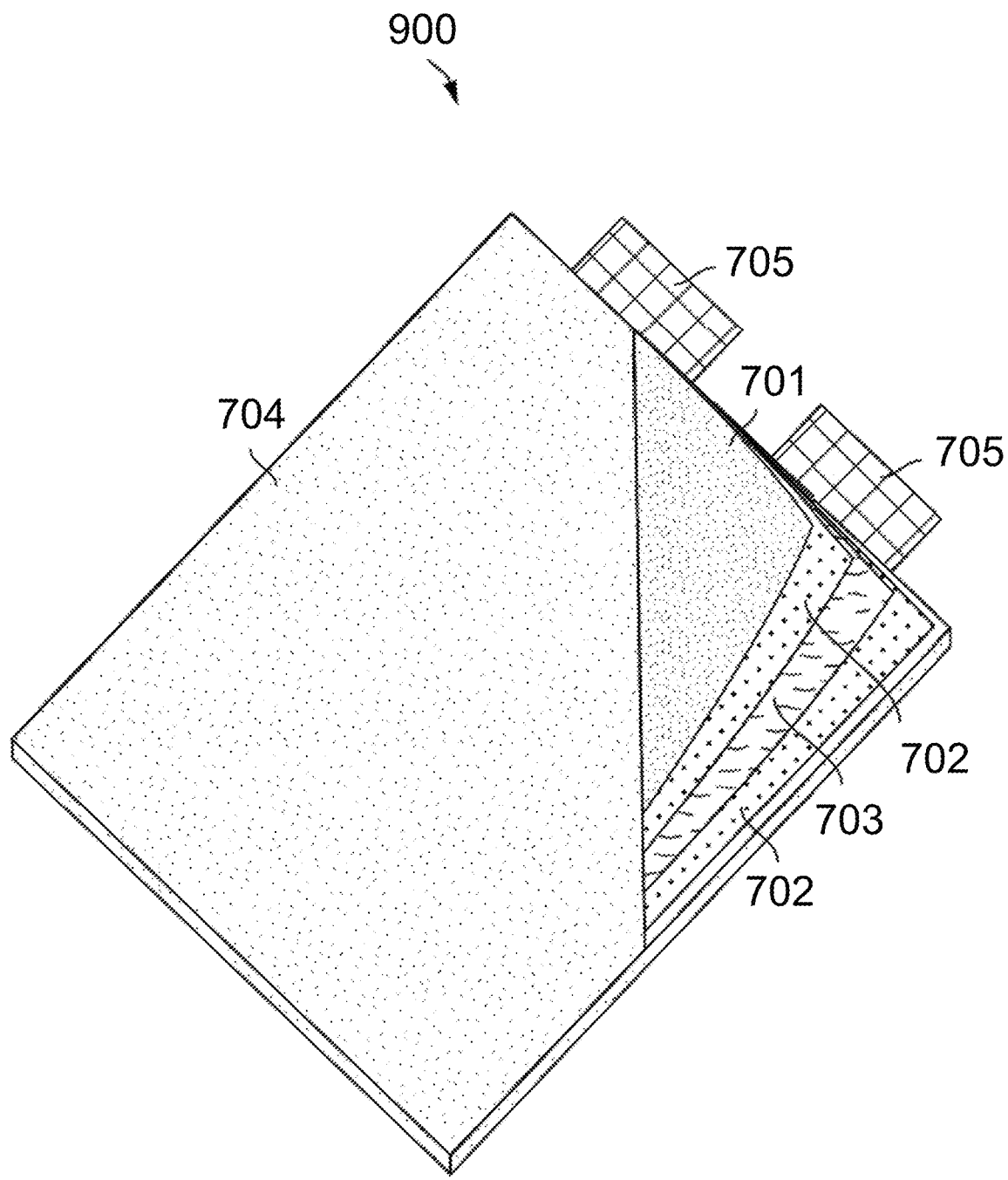
FIG. 9 depicts an illustrative example of a cross section view of a pouch battery cell in accordance with some embodiments disclosed herein.

FIG. 9 depicts an illustrative example of a cross section view of a pouch battery cell 900. The pouch battery cells do not have a rigid enclosure and instead use a flexible material for the casing/housing 704. This flexible material can be, for example, a sealed flexible foil. The pouch battery cell can include layers (e.g., sheet-like layers) of anode layers 701, separator and/or electrolyte layers 702, and cathode layers 703. The battery cell can include one or more MAX compound layers within the anode layer 701 and/or cathode layers 703. In some embodiments, these layers are stacked in the casing/housing. In some embodiments, the pouch battery cell 900 can include more than one terminal 705. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 604, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 10:
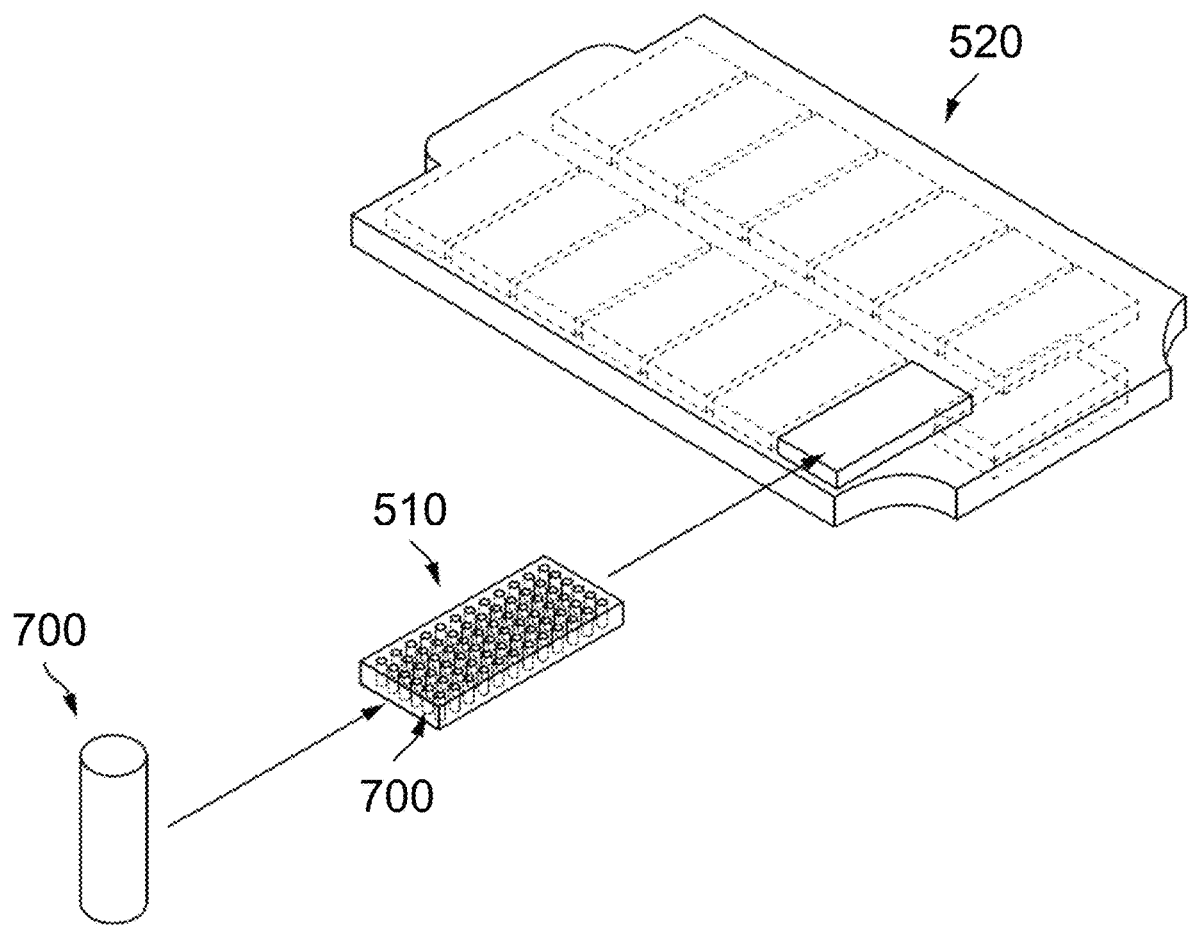
FIG. 10 illustrates cylindrical battery cells being inserted into a frame to form a battery module and pack in accordance with some embodiments disclosed herein.
Figure 11:
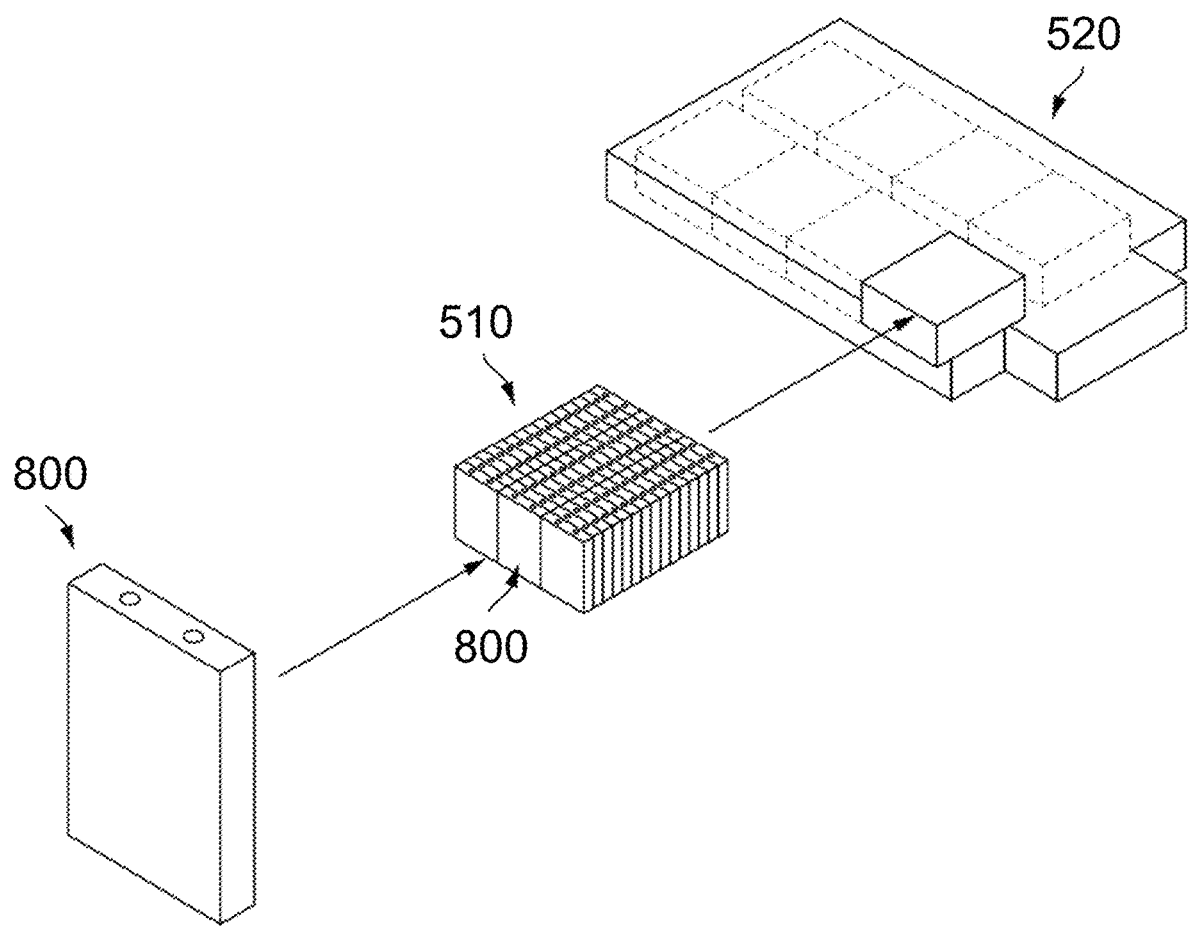
FIG. 11 illustrates prismatic battery cells being inserted into a frame to form a battery module and pack in accordance with some embodiments disclosed herein.
Figure 12:
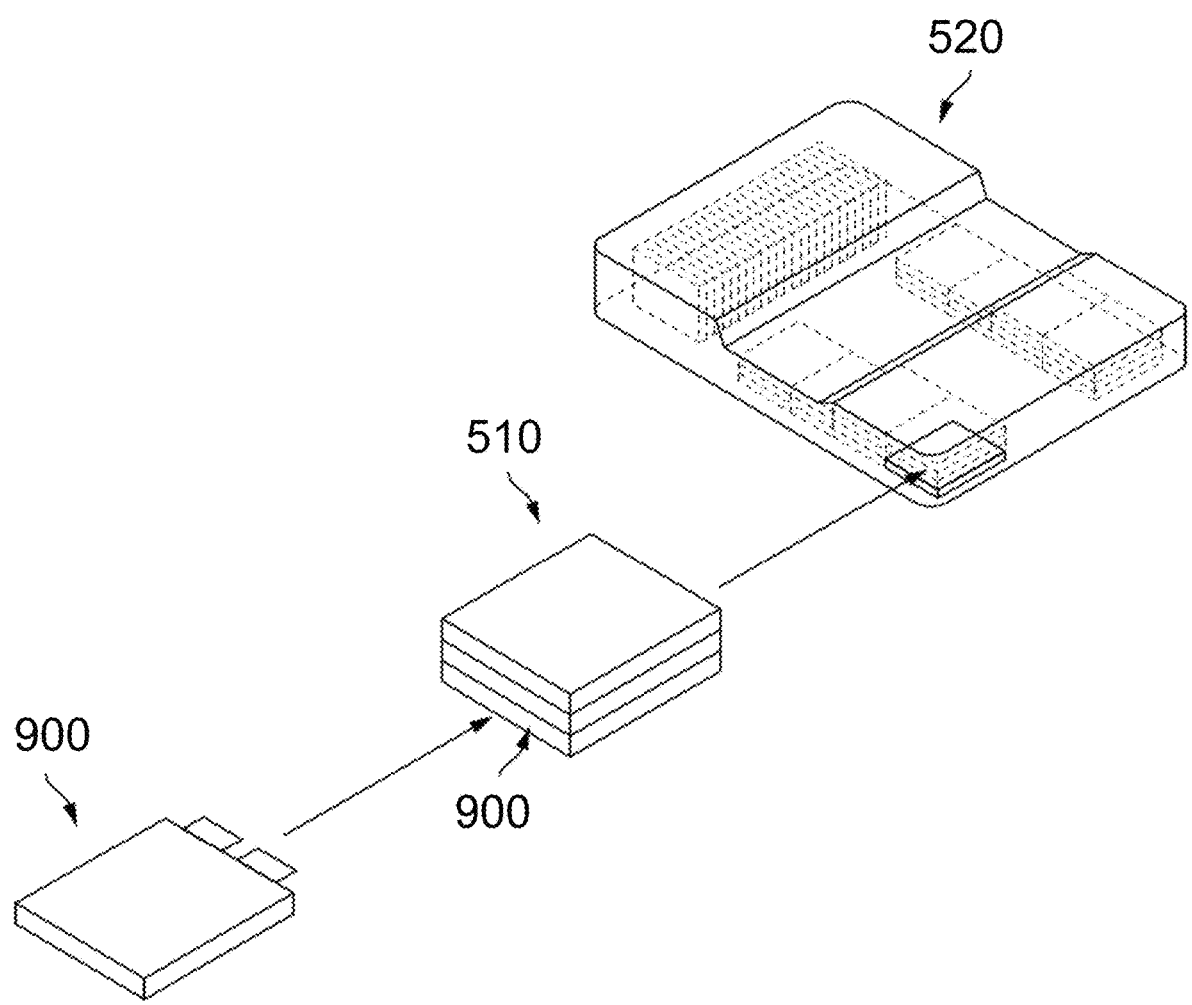
FIG. 12 illustrates pouch battery cells being inserted into a frame to form a battery module and pack in accordance with some embodiments disclosed herein.

A plurality of battery cells (700, 800, and/or 900) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 10 illustrates cylindrical battery cells 700 being inserted into a frame to form battery module 510. FIG. 11 illustrates prismatic battery cells 800 being inserted into a frame to form battery module 510. FIG. 12 illustrates pouch battery cells 900 being inserted into a frame to form battery module 510. In some embodiments, the battery pack may not include modules. For example, the battery pack can have a "module-free" or cell-to-pack configuration wherein battery cells are arranged directly into a battery pack without assembly into a module.

A plurality of the battery modules 510 can be disposed within another housing, frame, or casing to form a battery pack 520 as shown in FIGS. 10-12. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 10-12 illustrates three differently shaped battery packs 520. As shown in FIGS. 10-12, the battery packs 520 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 13:
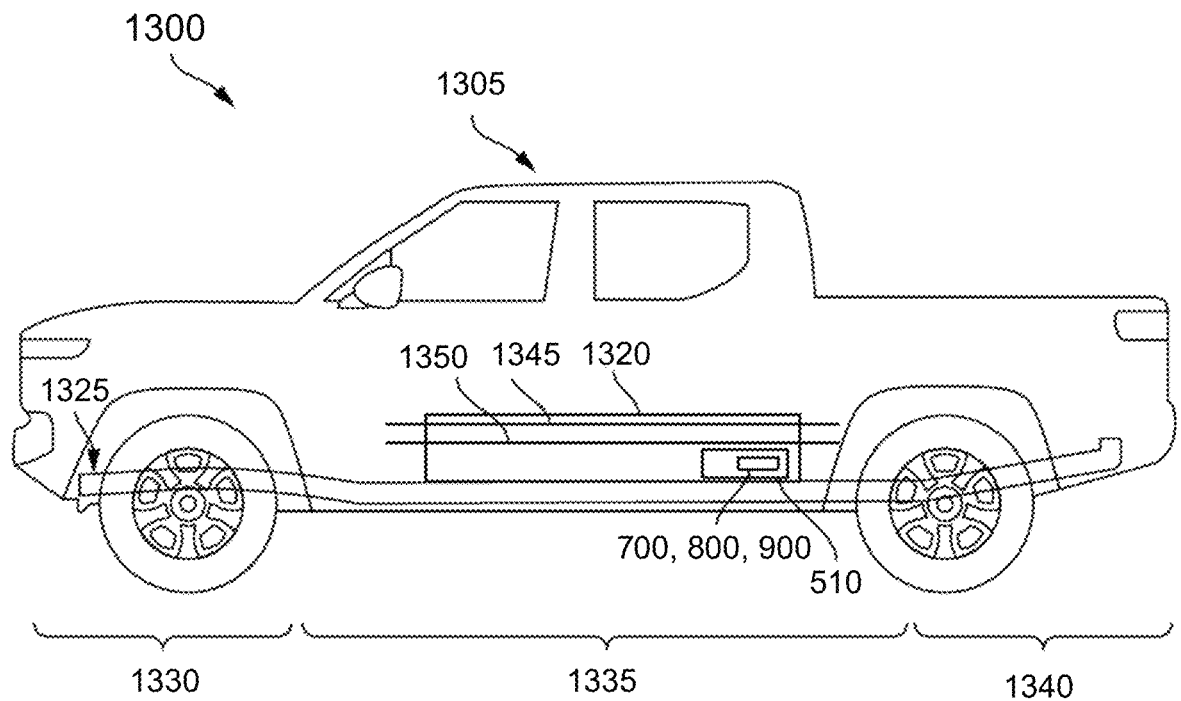
FIG. 13 illustrates an example of a cross sectional view of an electric vehicle that includes at least one battery pack in accordance with some embodiments disclosed herein.

FIG. 13 illustrates an example of a cross sectional view 1300 of an electric vehicle 1305 that includes at least one battery pack 520. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 1305 can be installed with a battery pack 520 that includes battery modules 510 with battery cells (700, 800, and/or 900) to power the electric vehicles. The electric vehicle 1305 can include a chassis 1325 (e.g., a frame, internal frame, or support structure). The chassis 1325 can support various components of the electric vehicle 1305. In some embodiments, the chassis 1325 can span a front portion 1330 (e.g., a hood or bonnet portion), a body portion 1335, and a rear portion 1340 (e.g., a trunk, payload, or boot portion) of the electric vehicle 1305. The battery pack 520 can be installed or placed within the electric vehicle 1305. For example, the battery pack 520 can be installed on the chassis 1325 of the electric vehicle 1305 within one or more of the front portion 1330, the body portion 1335, or the rear portion 1340. In some embodiments, the battery pack 520 can include or connect with at least one busbar, e.g., a current collector element. For example, the first busbar 1345 and the second busbar 1350 can include electrically conductive material to connect or otherwise electrically couple the battery pack 520 (and/or battery modules 510 or the battery cells 700, 800, and/or 900) with other electrical components of the electric vehicle 1305 to provide electrical power to various systems or components of the electric vehicle 1305. In some embodiments, battery pack 520 can also be used as an energy storage system to power a building, such as a residential home or commercial building instead of or in addition to an electric vehicle.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A lithium-ion battery comprising a cathode comprising manganese; an anode; a separator; and a non-aqueous liquid electrolyte;

wherein the anode, cathode or separator includes a compound of formula $M_{n+1}AX_n$, wherein:

M is an early transition metal atom;

n is an integer from 1 to 3;

A is a group 13 or group 14 element; and

X is C or N.

2. The lithium-ion battery of claim 1, wherein M is Cr, Ti, or Zr.

3. The lithium-ion battery of claim 1, wherein A is Al or Si, and X is C.

4. The lithium-ion battery of claim 1, wherein n is 1 or 2.

5. The lithium-ion battery of claim 1, wherein the compound is $Cr_2AlC$, $Ti_3SiC_2$ or $Zr_2AlC$.

6. The lithium-ion battery of claim 1, wherein the compound is $V_2AlC$ or $Ti_3AlC_2$.

7. The lithium-ion battery of claim 1, wherein the compound is $Nb_2AlC$, $Nb_3AlC_2$, $Nb_4AlC_3$, or $V_4AlC_3$.

8. The lithium-ion battery of claim 1, the anode comprises the compound.

9. The lithium-ion battery of claim 8, wherein the compound is mixed with anode active material of the anode.

10. The lithium-ion battery of claim 8, comprising:

a first layer comprising anode active material of the anode; and a second layer adjacent the first layer comprising the compound.

11. The lithium-ion battery of claim 8, wherein the anode comprises graphite and/or silicon.

12. The lithium-ion battery of claim 1, the cathode comprises the compound.

13. The lithium-ion battery of claim 12, wherein the cathode comprises one or more of lithium iron manganese phosphate, lithium manganese oxide, and $Li_2MnO_3$.

14. The lithium-ion battery of claim 1, the separator comprises the compound.

15. The lithium-ion battery of claim 1, wherein the compound is deposited as a film.

16. The lithium-ion battery of claim 1, wherein the compound has a $P6_3$ space group.

17. The lithium-ion battery of claim 1, wherein the compound comprises a layered structure.

18. The lithium-ion battery of claim 17, wherein the compound comprises edge-sharing, distorted $XM_6$ octahedra interleaved by single planar layers of A.

19. The lithium-ion battery of claim 1, wherein the compound comprises 0.1 to 10 wt. % of the lithium-ion battery.

20. An electric vehicle system comprising the lithium-ion battery of claim 1.

* * * * *